US009886563B2

(12) United States Patent
Sardesai et al.

(10) Patent No.: US 9,886,563 B2
(45) Date of Patent: Feb. 6, 2018

(54) PERSONALIZED ONLINE CONTENT ACCESS EXPERIENCES USING INFERRED USER INTENT TO CONFIGURE ONLINE SESSION ATTRIBUTES

(71) Applicant: Box, Inc., Los Altos, CA (US)

(72) Inventors: Vikram Sardesai, San Jose, CA (US); Ketki Warudkar, Menlo Park, CA (US); Ravi Teja Tiruvury, San Jose, CA (US); Matthew Self, Emerald Hills, CA (US); Rand Wacker, Belmont, CA (US)

(73) Assignee: Box, Inc., Redwood City, CA (US)

( * ) Notice: Subject to any disclaimer, the term of this patent is extended or adjusted under 35 U.S.C. 154(b) by 116 days.

(21) Appl. No.: 14/952,640

(22) Filed: Nov. 25, 2015

(65) Prior Publication Data

US 2017/0147796 A1    May 25, 2017

(51) Int. Cl.
 *G06F 21/10* (2013.01)
 *H04L 29/08* (2006.01)
 *H04L 29/06* (2006.01)
 *G06Q 10/10* (2012.01)

(52) U.S. Cl.
 CPC ......... *G06F 21/10* (2013.01); *G06Q 10/1053* (2013.01); *H04L 63/102* (2013.01); *H04L 63/20* (2013.01); *H04L 67/1097* (2013.01); *H04L 67/306* (2013.01)

(58) Field of Classification Search
 CPC ....... G06F 21/10; H04L 63/20; H04L 63/102; H04L 67/306; H04L 67/1097
 See application file for complete search history.

(56) References Cited

U.S. PATENT DOCUMENTS 8,909,749 B2 * 12/2014 Branch ................. G06F 9/4856
                                                       709/217
2003/0179240 A1    9/2003  Gest
2011/0154465 A1    6/2011  Kuzin et al.
(Continued)

OTHER PUBLICATIONS

Non-Final Office Action dated May 18, 2017 for U.S. Appl. No. 14/952,627.
(Continued)

*Primary Examiner* — Beemnet Dada
(74) *Attorney, Agent, or Firm* — Vista IP Law Group, LLP

(57) ABSTRACT

Systems for managing personalized access to shared online objects. A user accesses a server in a cloud-based environment, wherein the server is interfaced with storage devices that store one or more content objects. The server receives communications packets comprising at least one session attribute, wherein receiving the one or more communications packets is responsive, either directly or indirectly, to an act of the user to invoke a new content access session. The session attribute is used to generate personalized workspace properties that are based on explicitly-provided information or based on inferences that pertain to the invoked content access session. Access to content objects is personalized using explicit or inferred workspace session properties. Personalization includes any aspects of branding preferences, working group colleagues, roles, privileges, friends, etc. Personalization can be based on personalized workspace properties that are inferred based on rules or combinations of data.

20 Claims, 14 Drawing Sheets

(56) References Cited

U.S. PATENT DOCUMENTS

2012/0084570 A1    4/2012   Kuzin et al.
2013/0073703 A1    3/2013   Das et al.
2014/0109243 A1    4/2014   Ting et al.

OTHER PUBLICATIONS

Ping Identity. Ping Federate Java Integration Kit User Guide. Version 2.5.1. 2012.
Final Office Action dated Nov. 17, 2017 for U.S. Appln. No. 14/952,627.

* cited by examiner

PERSONALIZED ONLINE CONTENT ACCESS EXPERIENCES USING INFERRED USER INTENT TO CONFIGURE ONLINE SESSION ATTRIBUTES

RELATED APPLICATIONS

The present application is related to co-pending U.S. patent application Ser. No. 14/952,627 titled, "PERSONALIZED ONLINE CONTENT ACCESS EXPERIENCES USING ONLINE SESSION ATTRIBUTES" filed on even date herewith, which is hereby incorporated by reference in its entirety.

FIELD

This disclosure relates to managing secure access to shared online objects, and more particularly to techniques for providing personalized online content access experiences using explicit or inferred online session attributes.

BACKGROUND

The proliferation of cloud-based services and platforms continues to increase. Specifically, cloud-based content management services and platforms have impacted the way personal and corporate information is stored, and has also impacted the way personal and corporate information is shared and managed. Individuals can avail themselves of such storage and management services to store and share large volumes of personal content objects such as pictures and videos.

Enterprises (e.g., companies, firms, etc.) might also want to use cloud-based content management platforms to secure, store and manage sensitive proprietary content objects, while enhancing the experience and productivity of their workforce (e.g., active employees) and/or their customers (e.g., clients, vendors, contractors, partners, etc.). For example, the enterprise might want to provide their active employees access to the flexible provisioning (e.g., access, roles, sharing, etc.) and collaboration components (e.g., tasks, comments, workflow, etc.) delivered by a content management platform provider.

Further, the enterprise might want to control and manage the user experience when accessing a cloud-based content management platform, and further, might want to control and manage the user experience when users access the services provided by various other software applications as might be provided or sanctioned by the enterprise. For example, the enterprise might want to provide a "single sign-on" (e.g., SSO) feature to provide active employees the convenience of just one authentication and authorization process to access the broad range of such software applications provided or sanctioned by the enterprise. As another example, the enterprise might want to further improve the user experience by providing personalized online access to a cloud-based content management platform by delivering online content, provisioning, and other experience characteristics specific to a given user. In some cases, the enterprise might want to dynamically establish characteristics of content access and/or dynamically manage a user's experience in doing so (e.g., by provisioning at the time of the request). To accurately, securely and effectively provide such user experiences, the current user information known by the enterprise (e.g., in an active directory) needs to be also known to the cloud-based content management platform at the time of the request. However, challenges can arise for an enterprise when availing current user information to a cloud-based content management platform and/or when availing current user information to other services and applications.

Legacy approaches to ensuring availability of current user information to enable convenient and personalized online user experiences (e.g., online content access provisioning) have several technological limitations. In one legacy approach, the cloud-based content management platform can continually poll the enterprise active directory for the most current user information. Such an approach can require significant computing resources to perform the polling, yet still might suffer from the effects of using unsynchronized information that can happen due to delays between polls, open sessions, and other reasons. Another legacy approach might require a dedicated computing platform to push new user information from the enterprise to the cloud-based content management platform and/or to other approved applications and services. Such an approach might require the enterprise (e.g., account administrators, IT systems, etc.) to apply different technologies and protocols among the many approved services and applications, which in turn can demand employment of significant computing resources as well as employment of human resources.

What is needed is a technique or techniques to improve the application and efficacy of various technologies as compared with the application and efficacy of legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for providing personalized online content access experiences using online session attributes. Embodiments are directed to technological solutions for receiving online content access session attributes from an enterprise (e.g., identity provider), and dynamically generating corresponding online content access workspace properties based on such session attributes, which embodiments advance the relevant technical fields, as well as advancing peripheral technical fields. The herein-disclosed techniques provide technical solutions that address the technical problems attendant to dynamically establishing personalized online user content access experiences (e.g., provisioning) using information that is not available or calculated prior to the access request. Such technical solutions serve to reduce use of computer memory, reduce demand for computer processing power, and reduce communication overhead needed. For example, the technical solutions provided by the herein-disclosed techniques eliminate the need for computing resources required for a cloud-based content management platform to perform continuous polling of an enterprise active directory. Further, the herein-disclosed techniques eliminate or reduce the need for computing resources required for the enterprise to execute a dedicated push operation of new data from the enterprise's active directory to the cloud-based content management platform. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance online computing as well as advances in various technical fields related to distributed storage.

In one implementation, a user accesses a server in a cloud-based environment, wherein the server is interfaced with one or more storage devices that store one or more content objects accessible by one or more users. The server receives communications packets comprising at least one session attribute (e.g., an explicit session attribute or an inferred session attribute), wherein receiving the one or more communications packets is responsive to an act of the user to invoke a content access session. The session attribute is used to generate personalized workspace properties that pertains to the invoked content access session. Access to content objects is personalized (e.g., based on the one or more workspace session properties).

Further details of aspects, objectives, and advantages of the technological embodiments are described herein in the following descriptions, drawings, and claims

BRIEF DESCRIPTION OF THE DRAWINGS

The drawings described below are for illustration purposes only. The drawings are not intended to limit the scope of the present disclosure.

DETAILED DESCRIPTION

Figure 1A:
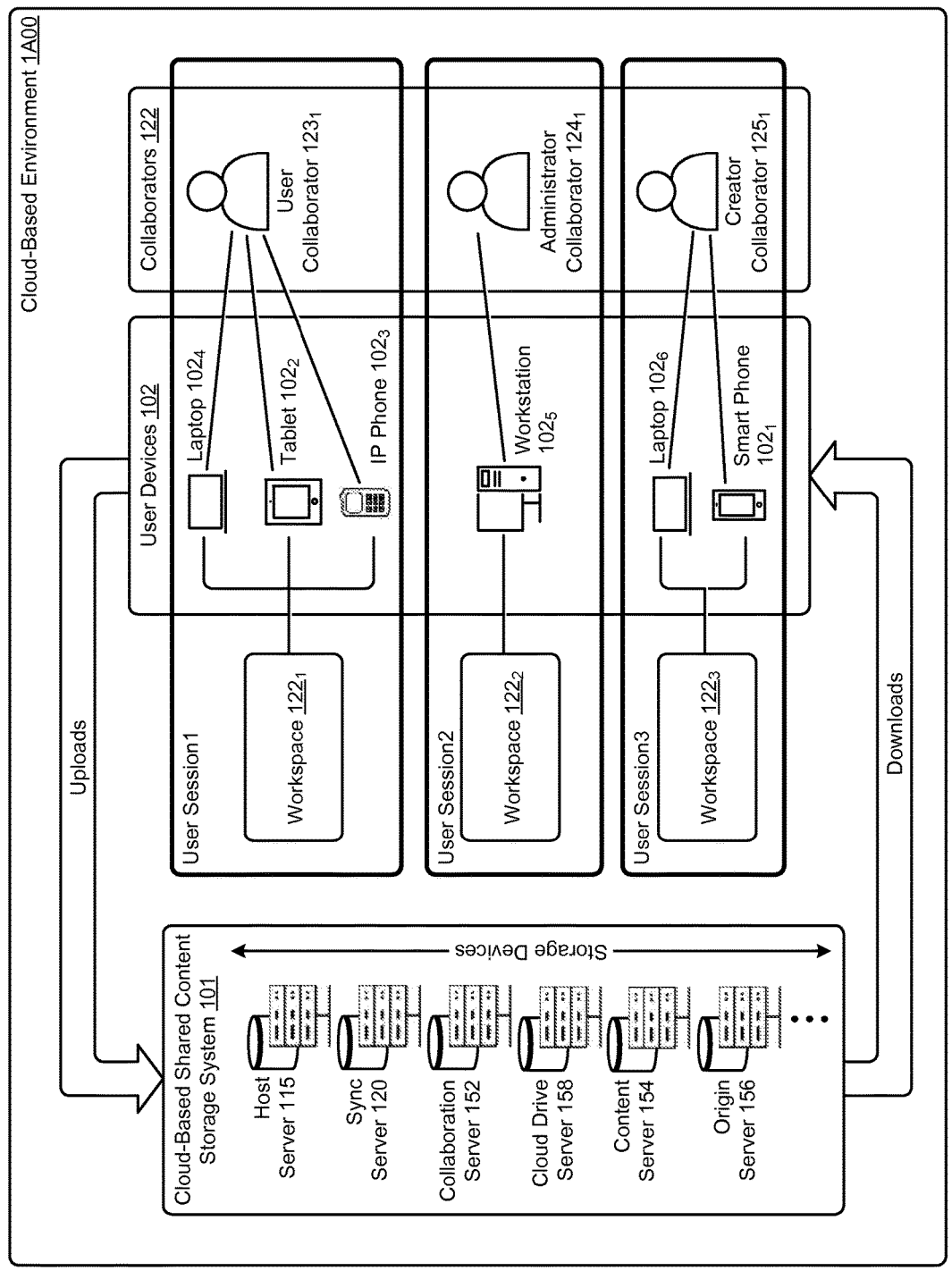
FIG. 1A presents a cloud-based environment, including a cloud-based shared content management platform, for managing personalized online content access experiences using online session attributes, according to an embodiment.

Some embodiments of the present disclosure address the problem of dynamically establishing personalized online user content access experiences (e.g., provisioning) using data that is not available prior to the access request and some embodiments are directed to approaches for receiving online content access session attributes from an enterprise (e.g., identity provider) and dynamically generating corresponding online content access workspace properties based on such session attributes.

The problem to be solved is rooted in technological limitations of the legacy approaches. Improved techniques, in particular improved application of technologies, are needed to address the problem of dynamically establishing personalized online user content access experiences (e.g., provisioning) using explicitly-provided and/or inferred up-to-date session parameters (e.g., that related to a session experience) that was not available prior to the access request.

Disclosed herein and in the accompanying figures are exemplary environments, systems, methods, and computer program products for providing personalized online content access experiences using explicit and/or inferred online session attributes.

Overview

Enterprises (e.g., companies, firms, etc.) often want to use cloud-based content management platforms to secure, store and manage sensitive proprietary content objects, while enhancing the experience and productivity of their workforce (e.g., active employees) and/or their customers (e.g., clients, vendors, contractors, partners, etc.). To accurately, securely and effectively provide such user experiences, the current user information known by the enterprise (e.g., in an active directory) must also be known to the cloud-based content management platform, and such user information needs to be current at the time of the request.

To address the technological need for dynamically establishing user content access provisioning using data that is not available prior to the access request, the techniques described herein discuss (1) configuring a server in a cloud-based environment to interface with storage devices that store content objects accessible by multiple users; (2) receiving at the server various session attributes responsive to a user invoking a content access session; (3) generating workspace properties based on the explicitly-provided or inferred session attributes; and (4) provisioning access to the content objects by the user based on the workspace properties.

Further, described herein are techniques for (5) configuring a server in a cloud-based environment to interface with storage devices that store content objects accessible by multiple users; (6) receiving at the server various session attributes and user profile attributes responsive to a user invoking a content access session; (7) techniques for calculating various calculated session attributes (e.g., describing a predicted or inferred intent of the content access session) based on the session attributes and user profile attributes; (8) generating workspace properties based on the calculated session attributes; and (9) techniques for provisioning access to the content objects by the user based on the workspace properties.

Some embodiments include use of techniques for (10) configuring a server in a cloud-based environment to interface with storage devices that store content objects accessible by multiple users, wherein the storage devices also store user profiles comprising data items associated with the users; (11) identifying an active directory that stores user attributes associated with the users; (12) receiving at the server a portion of the user attributes responsive to a change in the portion of the user attributes; and (13) updating a portion of the data items based on the changed user attributes.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A presents a cloud-based environment 1A00, including a cloud-based shared content management platform, for managing personalized online content access experiences using online session attributes.

The shown cloud-based environment 1A00 depicts three sessions (e.g., user session1, user session2, user session3) operated by three different users (e.g., collaborators 122) having various collaboration roles (e.g., user collaborator $123_1$, administrator collaborator $124_1$, creator collaborator $125_1$, etc.) that can use one or more instances of user devices 102 to interact with respective workspaces (e.g., workspace $122_1$, workspace $122_2$, workspace $122_3$, etc.). The workspaces can be stored in any location, and are at least partially maintained by components within a cloud-based shared content storage system 101. Moreover, each workspace can be customized in accordance with a set of workspace parameters, and each session can be customized in accordance with a set of session parameters. As is herein-described, the aforementioned workspace parameters and session parameters can be defined by a third party. Accordingly, characteristics of the sessions and workspaces can be defined by the third party.

Sample Architecture

The cloud-based shared content storage system 101 supports any variety of processing elements and/or storage devices (e.g., a storage filer, a storage facility, etc.) and/or servers such as a host server 115, a sync server 120, a collaboration server 152, a cloud drive server 158, a content server 154, an origin server 156, etc.

Any of the users can access shared content from the cloud-based shared content storage system 101 without the additional process of manually downloading and storing a file locally onto an instance of the user devices 102 (e.g., smart phone $102_1$, tablet $102_2$, IP phone $102_3$, laptop $102_4$, workstation $102_5$, laptop $102_6$, etc.). For example, a content object (e.g., computer file, text document, audio file, video file, image file, etc.) created by the creator collaborator $125_1$ might be viewed by the user collaborator $123_1$ without informing the user collaborator $123_1$ where the file is stored or without prompting the user collaborator $123_1$ for a directory in which to access the file. Such a facility streamlines the frequently repeated sharing and collaboration processes.

Functions and techniques performed by the cloud-based shared content storage system 101 and/or the client side components (e.g., user devices 102, a sync client on an instance of the user devices 102, etc.) are described herein with further details and with reference to several examples.

Figure 1B:
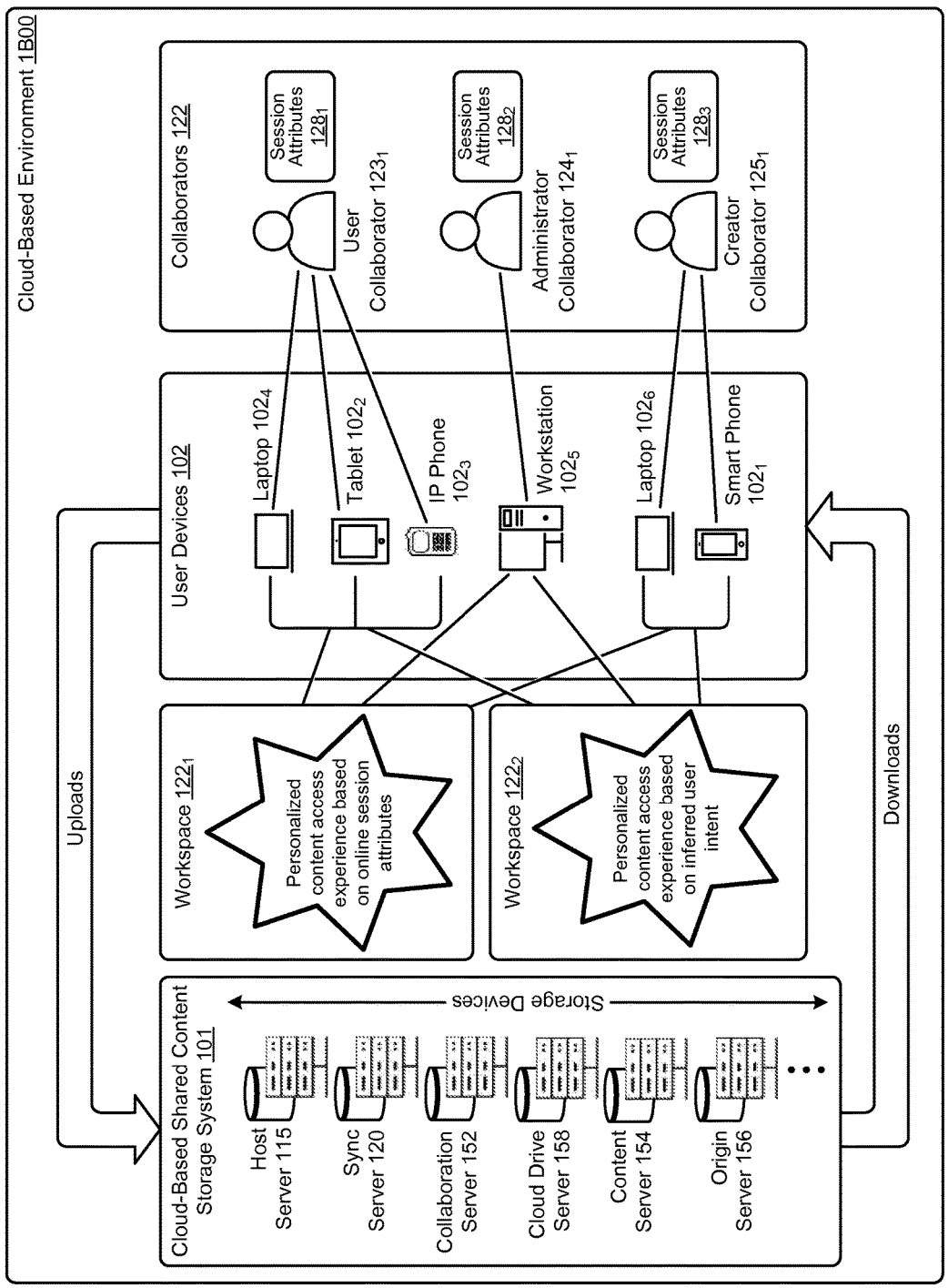
FIG. 1B presents a schematic view of workspaces that are populated with dynamically-created content to provide personalized online content access experiences using online session attributes, according to an embodiment.

FIG. 1B presents a schematic view 1B00 of workspaces that are populated with dynamically-created content to provide personalized online content access experiences using online session attributes. As an option, one or more variations of schematic view 1B00 or any aspect thereof may be implemented in the context of the architecture and functionality of the embodiments described herein. Also, the schematic view 1B00 or any aspect thereof may be implemented in any environment.

The embodiment shown in FIG. 1B is merely one example implementation of the cloud-based environment 1A00 where two or more of the collaborators 122 share a content object (e.g., computer file, electronic document, etc.), and where each collaborator has a certain access (e.g., for viewing, downloading, etc.) to the shared object in a respective collaborator-specific workspace (e.g., workspace $122_1$, workspace $122_2$, etc.). Moreover, a collaborator (e.g., the user collaborator $123_1$, the administrator collaborator $124_1$, and the creator collaborator $125_1$) might invoke a content access session described by certain instances of session attributes (e.g., session attributes $128_1$, session attributes $128_2$, and session attributes $128_3$, respectively). Such session attributes can comprise various information pertaining to a respective user (e.g., user attributes such as user ID, group, role, department, office location, etc.) and/or session metadata (e.g., time, duration, location, IP address, user device, etc.) and/or workspace metadata (e.g., file ID, etc.) and/or other attributes. At least a portion of the session attributes can be associated with one or more workspace properties, and such session attributes and/or workspace properties can be used in determining rules pertaining to how users share content objects. Moreover, such session attributes and/or workspace properties can be used in determining how users can view, preview, download, synchronize, print and otherwise access shared content objects. Further, according to the herein disclosed techniques, certain session attributes can be used to deliver personalized online content access experiences.

More specifically, the embodiment shown in FIG. 1B indicates certain operations corresponding to workspaces that present a personalized online content access experience to a given user for a given access session. For example, a personalized online content access experience based on online session attributes is shown in workspace $122_1$. Specifically, the content and provisioning provided in workspace $122_1$ to the user collaborator $123_1$ can be based at least in part on the session attributes $128_1$ pertaining to the specific content access session invoked by the user collaborator $123_1$. Further, a personalized experience can be provided to the administrator collaborator $124_1$ and the creator collaborator $125_1$ based on the session attributes $128_2$ and the session attributes $128_3$, respectively. In some cases, session attributes (e.g., property-value pairs) can be combined with certain user profile attributes (e.g., language, session history, work location, current location, branding preferences, working group colleagues, trust levels, friends, friends of friends, etc.) to provide a personalized online content access experience based on predicted or inferred user intent in workspace $122_2$. Specifically, the content and provisioning provided in workspace $122_2$ to the user collaborator $123_1$ can be based in part on certain calculated session attributes derived from session attributes $128_1$ and other user profile information (e.g., a history of accessing certain groups of documents) to infer the intent of the content access session invoked by user collaborator $123_1$.

Figure 1C:
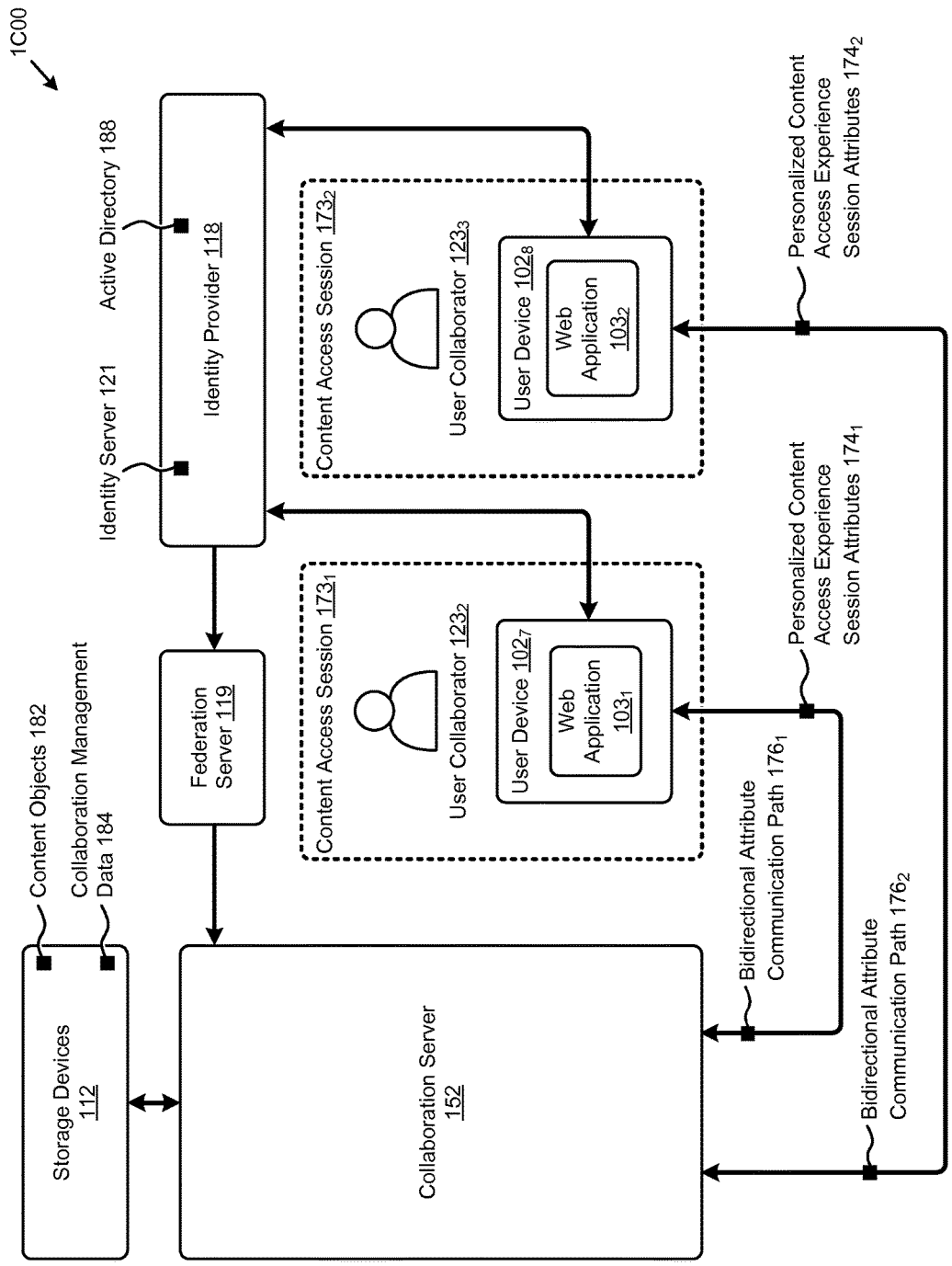
FIG. 1C is a schematic of a data flow to implement techniques for delivering personalized online content access experiences using online session attributes, according to an embodiment.

Further aspects of the herein disclosed techniques for delivering personalized online content access experiences using online session attributes as depicted in workspace $122_1$ and workspace $122_2$ are described in FIG. 1C and throughout.

FIG. 1C is a schematic 1C00 of a data flow to implement techniques for delivering personalized online content access experiences using online session attributes. As an option, one or more variations of schematic 1C00 or any aspect thereof may be implemented in the context of the architecture and functionality of the embodiments described herein. Also, the schematic 1C00 or any aspect thereof may be implemented in any environment.

The shown data flow implements collaboration delivering personalized online content access experiences using online session attributes. Collaborative and/or personalized content object sharing can take place concurrently with other accesses in multiple concurrent sessions involving multiple concurrently sharing users. Dynamically establishing user content access provisioning using data that is not available prior to the access request and other operations can be performed by the collaboration server 152. In some embodiments, the collaboration server 152 and certain instances of storage devices 112 can be included in a cloud-based content management platform. The collaboration server 152 can manipulate content object representations (e.g., views, previews, links, etc.) rather than manipulating the shared content object source, such as instances of content objects 182 stored in the storage devices 112. Such operations can be employed to deliver personalized online content access experiences using online session attributes and/or calculated session attribute values based on inferred user intent.

Specifically, for example, a user collaborator $123_2$ might be authenticated and authorized by an enterprise to use an instance of a web application (e.g., web application $103_1$) on a user device $102_7$. Further, a user collaborator $123_3$ might be authenticated and authorized by the enterprise to use another instance of the web application (e.g., web application $103_2$) on a user device $102_8$. In the shown embodiment, the enterprise can host a server (e.g., an identity server 121) to function as an identity provider. The identity provider 118 can, among other services and operations, provide a single sign-on (SSO) to access the cloud-based content management platform comprising the collaboration server 152 and/or access other services and platforms. In some embodiments, the identity provider 118 can have access to an active directory 188 comprising user attributes, policy rules, and other information the identity provider 118 can use to authenticate and authorize users for various interactions with the web application. The identity provider 118 can use any computing resources (e.g., an identity server 121) to access an active directory 188 and/or other forms of user authentication information so as to initiate a single sign-on protocol (e.g., to access the cloud-based content management platform comprising the collaboration server 152 using a single sign-on event).

For example, the user collaborator $123_2$ and the user collaborator $123_3$ might invoke a content access session $173_1$ and content access session $173_2$, respectively. The identity provider 118 can interface with a federation server 119 to securely provide session attributes (e.g., including user attributes) to the collaboration server 152. According to the herein disclosed techniques, the collaboration server 152 can use the received session attributes and certain instances of collaboration management data 184 (e.g., enterprise profiles, user profiles, user session logs, session experience rules, etc.) stored in the storage devices 112 to deliver personalized online content access experience session attributes $174_1$ and personalized online content access experience session attributes $174_2$ pertaining to the session for user collaborator $123_2$ and the session for user collaborator $123_3$, respectively. For example, the user collaborator $123_2$ might have a home office located in the United States, but may have invoked the content access session in a country for which the enterprise has established certain location-based provisioning restrictions. In this case, the collaboration server 152 can use the received session attributes to determine the location of the user collaborator $123_2$ and deliver the personalized online content access experience session attributes $174_1$ comprising the aforementioned location-based provisioning restrictions.

As another example, the user collaborator $123_3$ may have viewed a certain set of content objects in recent sessions. In this case, the collaboration server 152 can use the received session attributes and historical session logs for the user collaborator $123_3$ (e.g., stored in the collaboration management data 184) to infer that the intent of the user collaborator 123$_3$ is to view a certain set of content objects. Using the shown communication paths (e.g., bidirectional attribute communication path 176$_1$ and bidirectional attribute communication path 176$_2$), the collaboration server 152 can present such objects in the form of personalized content access experience session attributes. In some cases, a personalized content access experience session attribute or derivative therefrom can be communicated from a workspace data structure or session data structure (e.g., see content access session 173$_1$ and content access session 173$_2$) to the collaboration server. The collaboration server can calculate further personalized content access experience session attributes to be delivered to the user. The foregoing techniques and approaches for providing personalized online content access experiences using online session attributes can be implemented in a variety of environments, some of which are shown and discussed below.

Figure 2A:
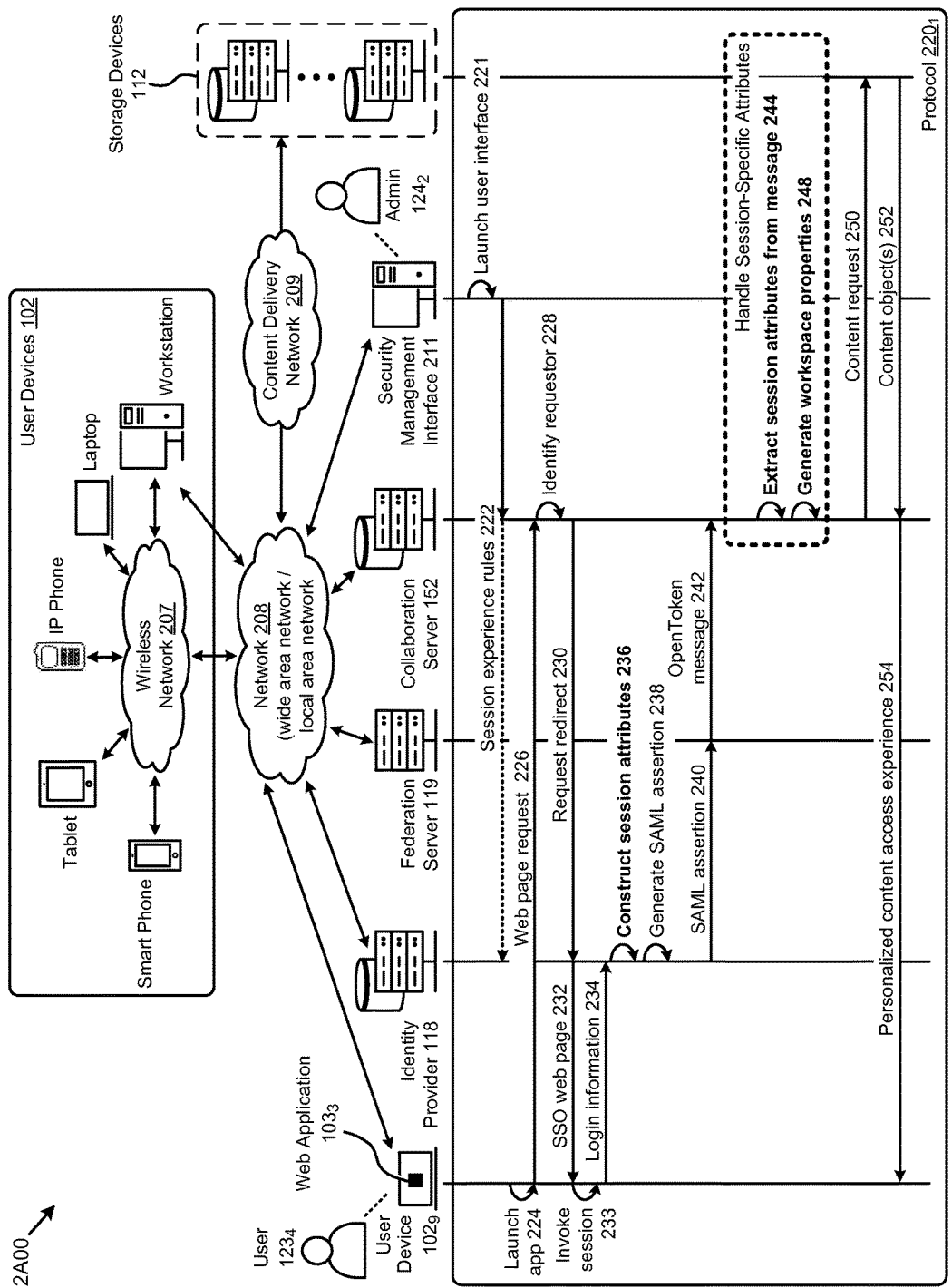
FIG. 2A is a diagram of a computing environment that supports a protocol used by cloud-based shared content storage system components to provide personalized online content access experiences using online session attributes, according to an embodiment.

FIG. 2A is a diagram of a computing environment 2A00 that supports a protocol used by cloud-based shared content storage system components to provide personalized online content access experiences using online session attributes.

As shown in FIG. 2A, the computing environment 2A00 comprises various computing systems (e.g., servers and devices) interconnected by a wireless network 207, a network 208, a content delivery network 209, and/or any other network components. The wireless network 207, the network 208, and the content delivery network 209 can comprise any combination of a wide area network (e.g., WAN), local area network (e.g., LAN), cellular network, wireless LAN (e.g., WLAN), or any such means for enabling communication of computing systems. The wireless network 207, the network 208, and the content delivery network 209 can also collectively be referred to as the Internet. The content delivery network 209 can comprise any combination of a public network and a private network. More specifically, computing environment 2A00 comprises at least one instance of the collaboration server 152, at least one instance of the identity provider 118, at least one instance of the federation server 119, at least one instance of a security management interface 211, and the plurality of storage devices 112. The servers and storage devices shown in computing environment 2A00 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152 and the storage devices 112 can comprise a cloud-based content management platform that provides shared content management and storage services.

The computing environment 2A00 further comprises instances of user devices 102 (e.g., user device 102$_9$) that can represent any one of a variety of other computing devices (e.g., a smart phone, a tablet, an IP phone, a laptop, a workstation, etc.) having software (e.g., a web application 103$_3$, etc.) and hardware (e.g., a graphics processing unit, display, monitor, etc.) capable of processing and displaying information (e.g., web page, graphical user interface, etc.) on a display. The user device 102$_9$ can further communicate information (e.g., web page request, user activity, electronic files, computer files, etc.) over the wireless network 207, the network 208, and the content delivery network 209. As shown, the user device 102$_9$ can be operated by a user collaborator such as user 123$_4$. Also, the security management interface 211 can be operated by an administrator collaborator such as admin 124$_2$. In some cases, the admin 124$_2$ can represent an enterprise that operates the identity provider 118 and the web application 103$_3$.

As shown, the user device 102$_9$, the collaboration server 152, the identity provider 118, the federation server 119, the security management interface 211, and the storage devices 112 can exhibit a set of high-level interactions (e.g., operations, messages, etc.) in a protocol 220$_1$. Specifically, the protocol can represent interactions in systems for providing personalized online content access experiences using online session attributes. As shown, the admin 124$_2$ can launch an enterprise administrator interface on the security management interface 211 (see operation 221) to establish and upload certain session experience rules and other data items to the collaboration server 152 (see message 222). In some cases, the session experience rules and/or other rules (e.g., policy rules) and/or other information might further be delivered to the identity provider 118. The user can also launch an instance of the web application 103$_3$ on user device 102$_9$ (see operation 224) and issue to the collaboration server 152 a web page request (see message 226). The collaboration server 152 can identify the requestor (see operation 228) and redirect (e.g., a "302 redirect") the request to the identity provider 118 (see message 230). The identity provider 118 can then present a single sign-on or SSO web page to the user 123$_4$ (see message 232). The user 123$_4$ can then invoke a content access session (see operation 233) by signing on and sending the login information (e.g., login credentials) to the identity provider 118 (see message 234). The identity provider 118 can use the login information to construct certain instances of session attributes (see operation 236). For example, the login information can be used to look up certain user attributes (e.g., from the active directory 188 as shown in FIG. 1C) associated with the user 123$_4$ to verify that the user is authorized to access the services provided by the collaboration server 152 and associated computing and storage resources. Certain portions of such user attributes and other information (e.g., time, location, etc.) can be included in the session attributes. The identity provider 118 can structure the session attributes and other information in a form suitable for electronic transmission, such as a security assertion markup language or SAML assertion (see operation 238). The SAML assertion can be sent from the identity provider 118 to the federation server 119 (see message 240), which can then convert the SAML assertion to an encrypted OpenToken message for transmission to the collaboration server 152 (see message 242). In the shown embodiment, the implementation of the federation server 119, the SAML assertions, and the OpenToken messages can enable a secure transmission of the session attributes from the identity provider 118 (e.g., the enterprise) to the collaboration server 152 (e.g., the cloud-based content management platform), and thus enable the authentication of user 123$_4$ by the collaboration server 152 without requiring a user password at the collaboration server 152. Other configurations and components for providing such security and authentication are possible.

In response to receiving the OpenToken message, the collaboration server 152 can decrypt the OpenToken message and extract the session attributes (see operation 244). For example, the collaboration server 152 and the federation server 119 can implement various SSL keys, certificates, and other security management techniques to enable secure encryption and decryption of the OpenToken messages.

Using the received session attributes and/or the session experience rules and/or other information, certain workspace properties specific to the given session can be generated (see operation 248). Such workspace properties and associated content objects requested and received from the storage devices 112 (see message 250 and message 252) can be used to deliver a personalized online content access experience to the user $123_4$ (see message 254).

Some examples of the aforementioned session attributes and workspace properties are given as shown in Table 1.

TABLE 1

| Workspace properties | |
|---|---|
| Attribute/Property Identifier | Description |
| name | The name for the user; this is used to construct the public name that is visible to other users |
| is_sync_user | Governs whether the user is allowed to use sync |
| is_external_collab_restricted | Governs whether the user is allowed to collaborate externally |
| see_other_slaves | Governs whether the user can see other managed users in the enterprise |
| status | "active" allows full actions for a user "inactive" freezes a user's account and terminates any current session for the user "cannot_delete_edit" restricts the user to Uploader privileges "cannot_delete_edit_upload" restricts the user to viewer privileges |

Further details as pertains to the herein disclosed techniques are discussed below. In particular, the following FIG. 2B shows and describes embodiments where online content access experiences are fostered using inferences and/or calculated session attribute values based on such inferences.

Figure 2B:
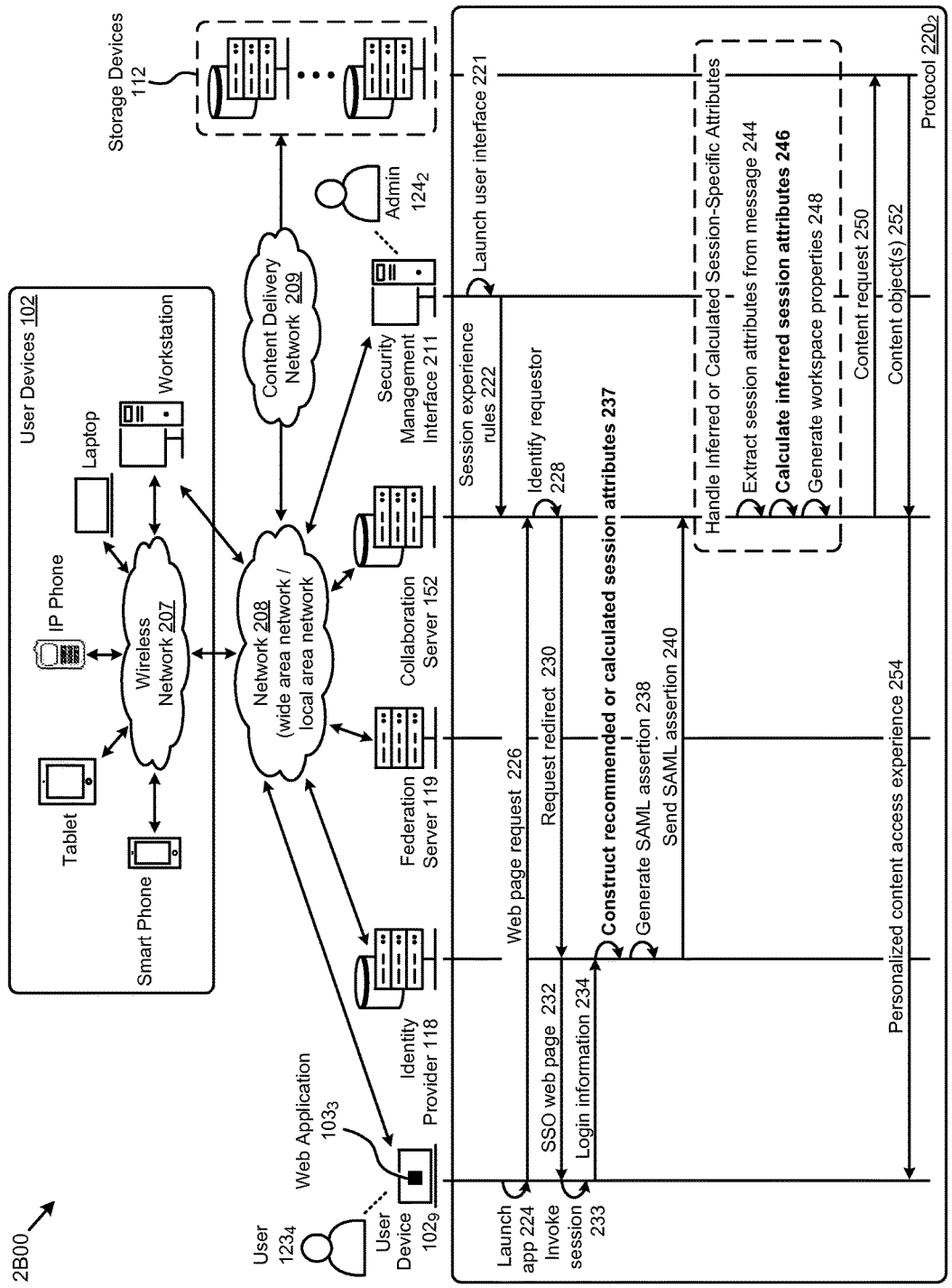
FIG. 2B is a diagram of a computing environment that supports a protocol used by cloud-based shared content storage system components to provide personalized online content access experiences using inferred or calculated session attributes, according to an embodiment.

FIG. 2B is a diagram of a computing environment 2B00 that supports a protocol used by cloud-based shared content storage system components to provide personalized online content access experiences using inferred or calculated session attributes.

The shown computing environment 2B00 comprises various computing systems (e.g., servers and devices) interconnected by a wireless network 207, a network 208, and a content delivery network 209. The wireless network 207, the network 208, and the content delivery network 209 can comprise any combination of a wide area network (e.g., WAN), local area network (e.g., LAN), cellular network, wireless LAN (e.g., WLAN), or any such means for enabling communication of computing systems. The wireless network 207, the network 208, and the content delivery network 209 can also collectively be referred to as the Internet. The content delivery network 209 can comprise any combination of a public network and a private network.

The computing environment 2B00 comprises at least one instance of the collaboration server 152, at least one instance of the identity provider 118, at least one instance of the federation server 119, at least one instance of a security management interface 211, and the plurality of storage devices 112. The servers and storage devices shown in computing environment 2B00 can represent any single computing system with dedicated hardware and software, multiple computing systems clustered together (e.g., a server farm, a host farm, etc.), a portion of shared resources on one or more computing systems (e.g., a virtual server), or any combination thereof. For example, the collaboration server 152 and the storage devices 112 can comprise a cloud-based content management platform that provides shared content management and storage services.

The computing environment 2B00 further comprises instances of user devices 102 (e.g., user device $102_9$) that can represent one of a variety of other computing devices (e.g., a smart phone, a tablet, an IP phone, a laptop, a workstation, etc.) having software (e.g., a web application $103_3$, etc.) and hardware (e.g., a graphics processing unit, display, monitor, etc.) capable of processing and displaying information (e.g., web page, graphical user interface, etc.) on a display. The user device $102_9$ can further communicate information (e.g., web page request, user activity, electronic files, computer files, etc.) over the wireless network 207, the network 208, and the content delivery network 209. As shown, the user device $102_9$ can be operated by a user collaborator such as user $123_4$. Also, the security management interface 211 can be operated by an administrator collaborator such as admin $124_2$. In some cases, the admin $124_2$ can represent an enterprise that operates the identity provider 118 and the web application $103_3$.

As shown, the user device $102_9$, the collaboration server 152, the identity provider 118, the federation server 119, the security management interface 211, and the storage devices 112 can exhibit a set of high-level interactions (e.g., operations, messages, etc.) in a protocol $220_2$. Specifically, the protocol can represent interactions in systems for providing personalized online content access experiences using inferred, predicted, or calculated session attributes. As shown, the admin $124_2$ can launch an enterprise administrator interface on the security management interface 211 (see operation 221) to establish and upload certain session experience rules and other data items to the collaboration server 152 (see message 222). In some cases, the session experience rules and/or other rules (e.g., policy rules) and/or other information might further be delivered to the identity provider 118. The user can also launch an instance of the web application $103_3$ on user device $102_9$ (see operation 224) and issue to the collaboration server 152 a web page request (see message 226). The collaboration server 152 can identify the requestor (see operation 228) and redirect (e.g., a "302 redirect") the request to the identity provider 118 (see message 230). The identity provider 118 can then present a single sign-on or SSO web page to the user $123_4$ (see message 232). The user $123_4$ can then invoke a content access session (see operation 233) by signing on and sending the login information (e.g., login credentials) to the identity provider 118 (see message 234). The identity provider 118 can use the login information to construct recommended or calculated session attributes (see operation 237). The identity provider can recommend branding characteristics. For example, the identity provider might determine that the user (e.g., the user corresponding to the login information) is associated with a particular project, such as a "ProjectA", and then provide information to facilitate look-and-feel aspects of a workspace that is tailored to "ProjectA".

Certain portions of such recommendations, inferences, user attributes and other information (e.g., logos, color palettes, messaging, etc.) can be included in the session attributes, including predicted session attributes. The identity provider 118 can structure such recommendations, inferences, user attributes and other information in a form suitable for electronic transmission, such as a security assertion markup language or SAML assertion (see operation 238).

In response to receiving a message comprising recommendations, inferences, user attributes and other information, the collaboration server 152 can extract the session attributes (see operation 244). In some cases, the collaboration server 152 might calculate certain session attributes corresponding to an inferred intent of the user $123_4$ for the given content access session (see operation 246). Such calculated session attributes can be based in part on the received session attributes, certain user characteristics and behaviors (e.g., historical session logs), certain behaviors from lookalike models (e.g., users in the same group, users in the same geography, users in the same or proximal geo-fence or other virtually-bounded area), and other information. Using the received session attributes and/or the calculated session attribute values and/or the session experience rules and/or other information, certain workspace properties specific to the given session can be generated (see operation 248).

In some cases, calculated session attribute values can be based in part on certain user characteristics and behaviors such as role or prominence in an organization (e.g., a vice-president might receive a different look-and-feel and/or different access characteristics than a contractor in the same firm). In some cases, calculated session attribute values can be based in part on certain user characteristics such as a level of experience, education or credentialing. As such, workspace properties and associated content objects requested and received from the storage devices 112 (see message 250 and message 252) can be used to deliver a personalized online content access experience to the user $123_4$ (see message 254).

Figure 3:
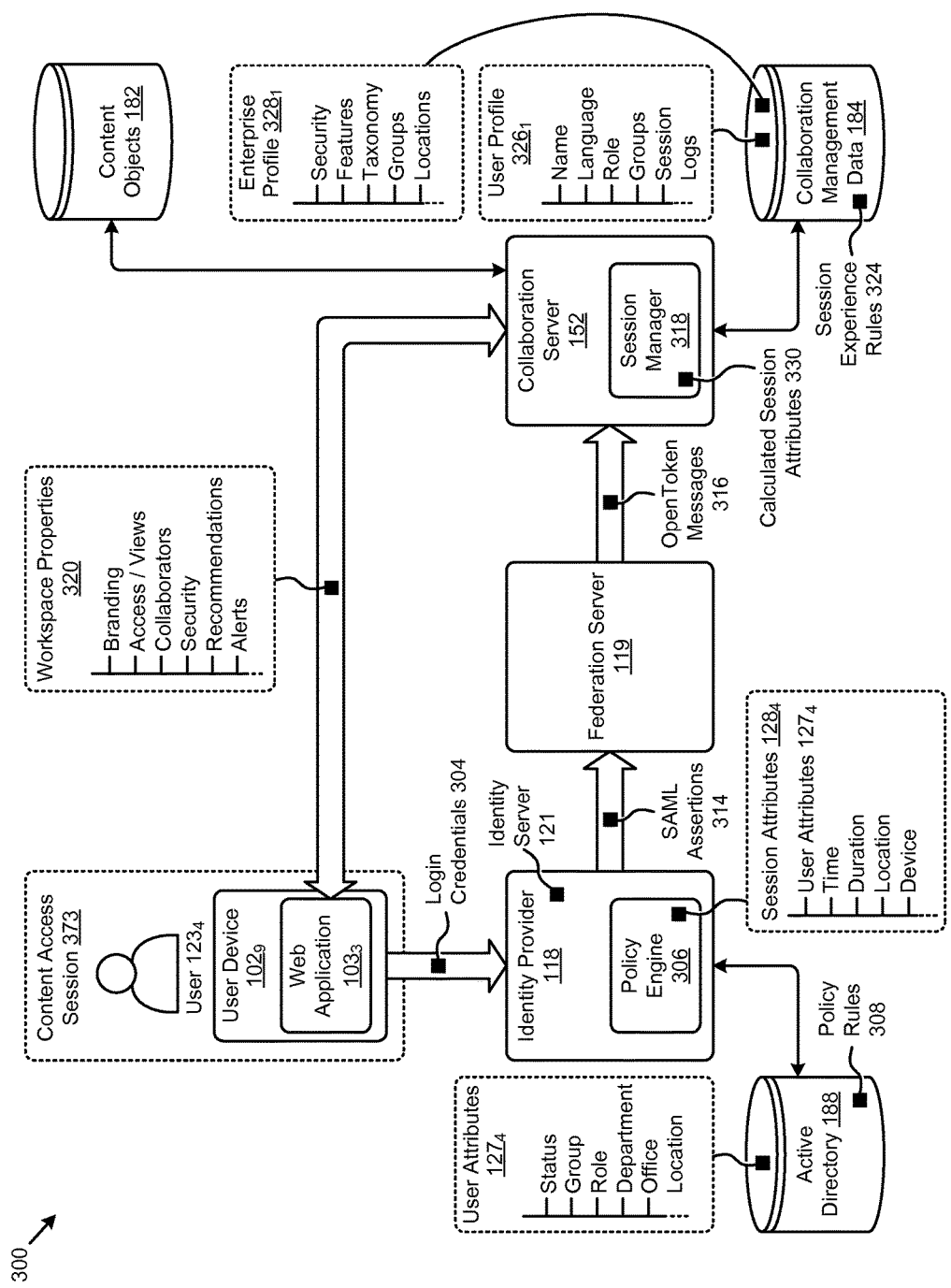
FIG. 3 is a block diagram of a system for managing personalized online content access experiences using online session attributes, according to an embodiment.

FIG. 3 is a block diagram of a system 300 for managing personalized online content access experiences using online session attributes. As an option, one or more variations of system 300 or any aspect thereof may be implemented in the context of the architecture and functionality of the embodiments described herein. Also, the system 300 or any aspect thereof may be implemented in any environment.

The system 300 shown in FIG. 3 can be used to manage and deliver personalized online content access experiences using online session attributes according to the herein disclosed techniques. Specifically, the system 300 shows the data records, data structures, communications links, communications packets, communications protocols, and other data item organization characteristics that can be used among the shown components and partitions for implementing the herein disclosed techniques. Other data item organization characteristics, components, and partitions are possible. More specifically, FIG. 3 shows the user $123_4$ invoking a content access session 373 using the web application $103_3$ at the user device $102_9$. For example, the user $123_4$ can invoke the content access session 373 by signing on at an SSO login web page rendered by the web application $103_3$. Such a sign on can transmit certain instances of login credentials 304 to the identity provider 118 such as a username, a password, and/or other credentials.

As shown, the identity provider 118 operates an identity server 121. The identity server 121 or another server might host a policy engine 306 to accept the login credentials 304 and apply certain instances of policy rules 308 to authenticate and authorize the user $123_4$ to use the web application $103_3$. The identity server 121 and/or the host of the policy engine 306 might further authenticate and authorize the user $123_4$ to perform related interactions (e.g., see the content access session 373). More specifically, the policy engine 306 can access the active directory 188 to retrieve the user attributes $127_4$ associated with the user $123_4$ based in part on the login credentials 304. The user attributes $127_4$ can comprise various data records holding security, employment, and other information specific to the user $123_4$ such as status (e.g., employment status), group (e.g., defining a collaboration group), role (e.g., mapped to use privileges), department, office location, and/or other information. For example, the policy engine 306 can evaluate the status of the user $123_4$ (e.g., Status="permanent", Status="temporary", etc.) using the policy rule 308 (e.g., if (Status=="permanent") then (Access="full"), if (Status=="temporary") then (Access="limited"), etc.) to determine an authorization scope granted to the user $123_4$.

In one or more embodiments, the user attributes $127_4$ can be managed by the enterprise operating the identity provider 118. For example, when onboarding a new employee, the enterprise (e.g., by admin $124_2$) can add a new set of user attributes associated with the new employee to the active directory 188. As another example, when an employee in the active directory 188 is promoted to a new position, certain user attributes associated with the job change (e.g., group, role, department, office location, etc.) can be updated. Such changes and updates to the user attributes $127_4$ can be applied by the policy engine 306 at the time of initial login or sign on by the user $123_4$, yet might not be available to the collaboration server 152 such that accurate and secure shared content provisioning can be provided to the user $123_4$ in the content access session 373. As described below and throughout, the herein disclosed techniques address the technical problems attendant to dynamically establishing personalized online user content access experiences (e.g., provisioning) using data that is not available prior to the access request.

Specifically, as shown, the policy engine 306 can be configured to construct a set of session attributes $128_4$ associated with the content access session 373 invoked by the user $123_4$. In some embodiments, the session attributes $128_4$ can comprise all or any of the user attributes $127_4$ and other data items, such as time (e.g., time session is invoked), duration (e.g., duration of session before timeout), location (e.g., IP address, geographical location, etc.), device (e.g., device type, device ID, etc.), and/or other data items. The policy engine 306 can then format the session attributes $128_4$ into one or more SAML assertions 314. The SAML assertions 314 can be XML-based and use security tokens to pass information about a principal (e.g., user $123_4$ invoking content access session 373) between a SAML authority (e.g., the identity provider 118) and a SAML consumer (e.g., the cloud-based content management platform comprising the collaboration server 152). Various bindings (e.g., HTTP redirect binding, HTTP POST binding, SOAP binding, etc.) can be used to transmit the SAML assertions 314 over various communications links. Further, the SAML assertions 314 can hold metadata encoded in an XML format. In some embodiments, custom metadata (e.g., key-value pairs) can be specified by the SAML authority (e.g., the identity provider 118) and the SAML consumer (e.g., the cloud-based content management platform comprising the collaboration server 152). For example, the enterprise and the cloud-based content management platform can define certain custom SAML metadata that can be used to implement the herein disclosed techniques. Table 2 provides examples of custom metadata.

TABLE 2

Custom metadata

| Identifier | Description |
|---|---|
| user location | The user's location, possibly changing with time (e.g., roaming); this can be used in calculating inferred session attributes pertaining to geographies and proximities |
| user language | The user's preferred language, possibly changing with time (e.g., roaming); this can be used in calculating inferred session attributes pertaining to localization, |

TABLE 2-continued

Custom metadata

| Identifier | Description |
| --- | --- |
| | geographies and proximities |
| user device | Governs some aspects of look-and-feel |
| user timezone | The user's timezone, possibly changing when the user is roaming; this can be used in calculating inferred session attributes pertaining to collaboration groups |
| user brand preferences | Used to infer, predict or calculate branding personalization, such as presentation of brand-specific logos and/or brand-specific colors in a user session |
| user theme preferences | Used to infer, predict or calculate look-and-feel in a user session |
| user role/ function | Used to infer, predict or calculate different look-and-feel characteristics; role and/or function can subsume aspects such as a level of experience, education or credentialing |
| setting | Used to infer, predict or calculate characteristics pertaining to a user's environment |
| status | Used to infer, predict or calculate characteristics pertaining to a user's access rights |

The foregoing are merely examples of individual metadata items. In addition to use of individual metadata items as above, key-value or property-value pairs can be used in combination. For example, any one or more of "user's groups", "user's schedule", and/or "user's default location" can be used to determine (e.g., possibly by inference) further properties and/or key-value pairs. Additional data or properties that can be used in making inferences include:

"list of SAML properties", from which can be inferred access rights;

"user's current location", from which can be inferred timezone-related collaboration parameters;

"user's historical usage patterns", from which can be inferred the likelihood to repeat a pattern;

"similar or look-alike user characteristics", from which can be inferred the likelihood to repeat the same patterns as similar or look-alike users;

"documented or measured product experiences and features", from which can be inferred the prominence of display of material in a session;

"branding" from which can be inferred the look-and-feel;

"collaboration with people not in active directory", from which can be inferred the presence of lower (or higher) security requirements;

"collaboration with people logging in externally", from which can be inferred the presence of lower (or higher) security requirements;

"trusted collaborators", from which can be inferred access rights to certain content;

"confidential classification of content" from which can be inferred the requirement to hide all confidential or highly confidential folders from view;

"log-in from corporate devices", from which can be inferred the permissions to expose certain folders; and "log-in from foreign devices" from which can be inferred the requirement to hide certain folders.

Continuing with the discussion of FIG. 3, the SAML assertions 314 can be sent to the federation server 119 where it can be converted to one or more instances of OpenToken messages 316 for encryption and transmission to the collaboration server 152. The OpenToken messages 316 are in the OpenToken (e.g., OTK) format, which is a format for a lightweight, secure, cross-application exchange of key-value pairs, encrypted using known encryption algorithms (e.g., Advanced Encryption Standard encryption, etc.). The OTK format is designed primarily for use as an HTTP cookie or query parameter, but may also be used in other scenarios that require a compact, application-neutral token. For example, in the embodiment shown in FIG. 3, the OpenToken messages 316 are used to transmit the key-value pairs of the session attributes $128_4$ to the collaboration server 152. Other formats for transmitting the session attributes $128_4$ are possible. In one or more embodiments, the OpenToken messages 316 comprising the session attributes $128_4$ and other information can be received by a session manager 318 or other session manager module operating on the collaboration server 152. The session manager 318 can accept the OpenToken messages 316 and decrypt and parse them to extract the session attributes $128_4$. The session manager 318 can apply certain instances of session experience rules 324, and other provisioning rules, to the session attributes $128_4$ to determine a set of workspace properties 320 that define a personalized online content access experience for user $123_4$.

More specifically, the session manager 318 can access the collaboration management data 184 to retrieve a user profile $326_1$ associated with the user $123_4$ based in part on one or more of the user attributes $127_4$ included in the session attributes $128_4$. As shown, the user profile $326_1$ can comprise various data records holding security, employment, and other information specific to the user $123_4$ such as name, language, role (e.g., mapped to sharing and access privileges), groups (e.g., defining sharing and collaboration groups), session logs (e.g., recording historical session attributes and associated activity), and/or other information. The session manager 318 might also access an enterprise profile $328_1$ when determining the workspace properties 320. The enterprise profile $328_1$ can comprise various enterprise-wide data records associated with user $123_4$ such as security (e.g., applied security methods), features (e.g., application features available to the enterprise), taxonomy (e.g., cross-reference and/or mapping of enterprise terms to application functions), groups (e.g., predefined enterprise groups), locations (e.g., predefine enterprise locations), and/or other information.

For example, the session manager 318 can analyze the session attributes $128_4$ to determine if the content access session 373 had been invoked from the country CTRY (e.g., Location="CTRY"). The session manager 318 can evaluate such information using the enterprise profile $328_1$ (e.g., the security information) and the session experience rules 324 to determine that access from CTRY should be limited (e.g., if (Location="CTRY") then (Access="limited")). Such results can be included in the workspace properties 320 (e.g., defining access, views, security, etc.) determined by the session manager 318. Other data items (e.g., branding, collaborators, recommendations, alerts, etc.) comprising the workspace properties 320 can be determined by the session manager 318 using the session attributes $128_4$, the collaboration management data 184, and/or other information.

In some cases, the session attributes $128_4$ received from the identity provider (e.g., the enterprise) might conflict with the collaboration management data 184 accessible by the collaboration server 152 (e.g., the cloud-based content management platform). For example, user $123_4$ might have been recently promoted such that the role of user $123_4$ was updated in the user attributes $127_4$ from Role="view" to Role="edit". In this example, the session attributes $128_4$ received by the session manager 318 might conflict insofar as the role in the user profile $326_1$, since the user profile $326_1$ retained the previously established role of user $123_4$. In one or more embodiments, the session manager 318 evaluates the session experience rules 324 and/or other rules and/or specifications to determine how to respond to such conflicts.

Specifically, the various rules and/or specifications might direct the session manager 318 to update the persistent data items in the collaboration management data with the corresponding newly updated information in the session attributes $128_4$ (e.g., the user profile $326_1$ can be updated with Role="edit"). In other cases, the various rules and/or specifications might direct the session manager 318 to treat certain information in the session attributes $128_4$ as temporary and not update the corresponding persistent data items in the collaboration management data 184.

In other cases, the session manager 318 might calculate certain session attributes (e.g., calculated session attributes 330) based in part on the session attributes $128_4$ in view of the collaboration management data 184. For example, the calculated session attributes 330 can correspond to an inferred intent of the content access session 373 invoked by the user $123_4$. Specifically, the user $123_4$ may have viewed a certain set of content objects in recent sessions. In this case, the session manager 318 can use the session attributes $128_4$ to pull the session logs from the user profile $326_1$ associated with the user $123_4$ to infer that the intent of the user $123_4$ is to view a certain set of content objects 182. In some cases, the inferred intent can be derived from various look-alike models comprising users other than user $123_4$ (e.g., users in the same group as user $123_4$). The session manager 318 can then codify such intent in the data items (e.g., view and/or recommendations comprise the certain set of content objects) of the workspace properties 320. Table 3 provides examples of inference actions.

TABLE 3

Inference action examples

| Data Item | Inferences | Actions |
| --- | --- | --- |
| user location | User will re-access the same content from previous accesses from this location | Pre-fetch and/or recommend that content |
| collaborators | User will access content frequently accessed by those collaborators | Pre-fetch and/or recommend that content |
| user device | User will repeat one or more of the most common actions taken on that device | Highlight or otherwise emphasize those most common actions when accessing from that device |

Figure 4A:
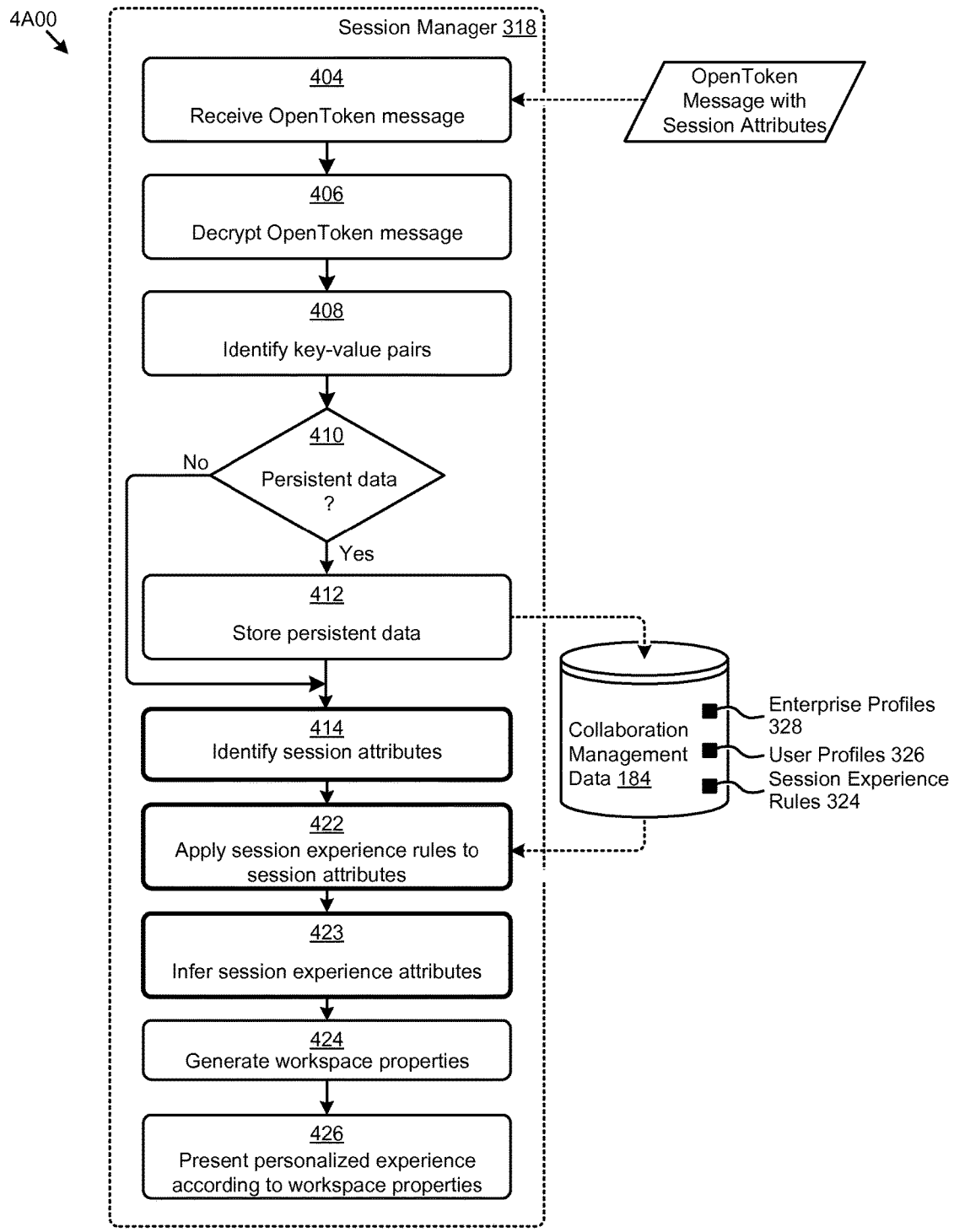
FIG. 4A depicts a session management technique implemented by systems for managing personalized online content access experiences using online session attributes, according to an embodiment.
Figure 4B:
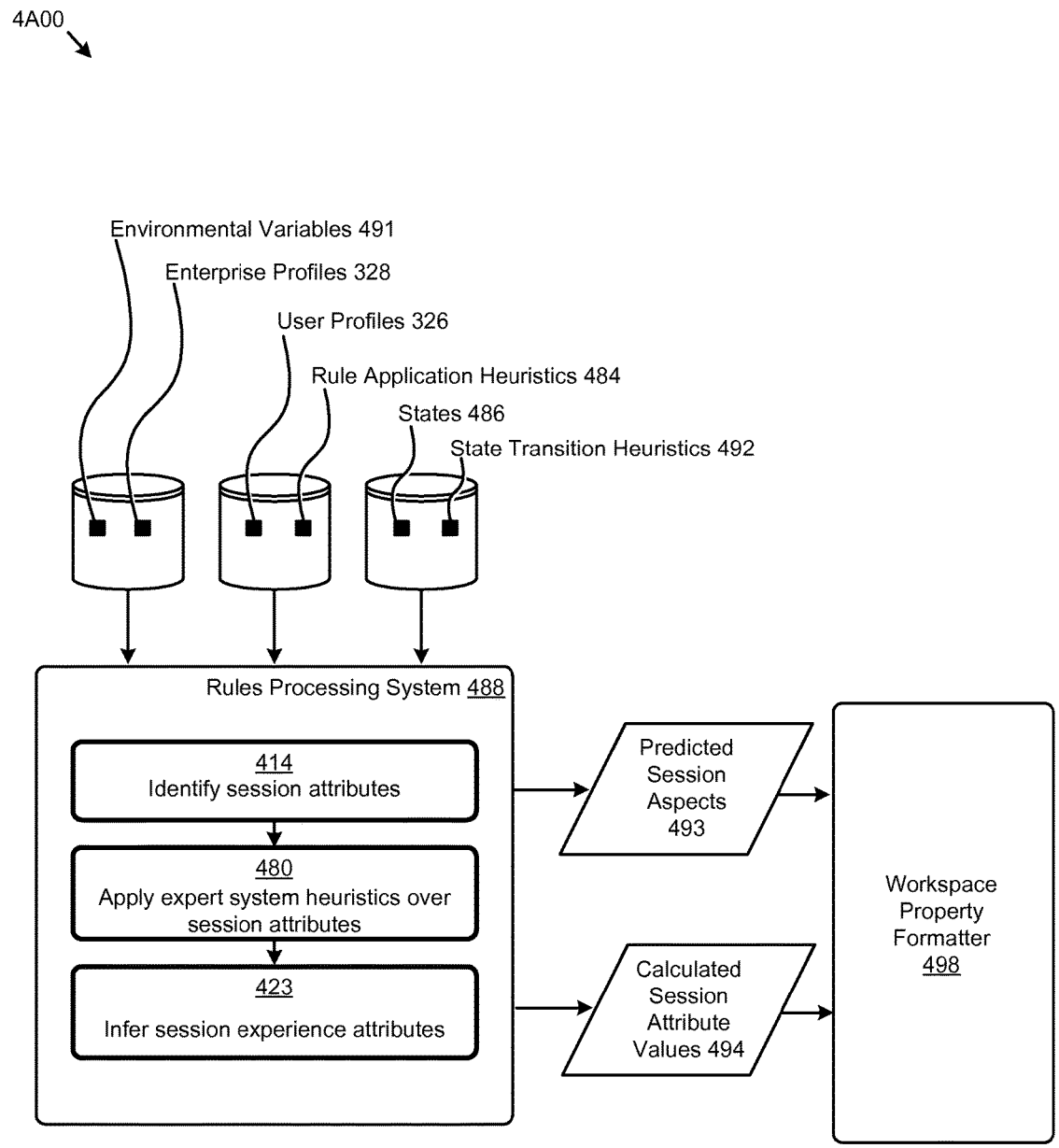
FIG. 4B depicts a session management technique implemented by systems for managing personalized online content access experiences using predicted session attributes, according to an embodiment.
Figure 5:
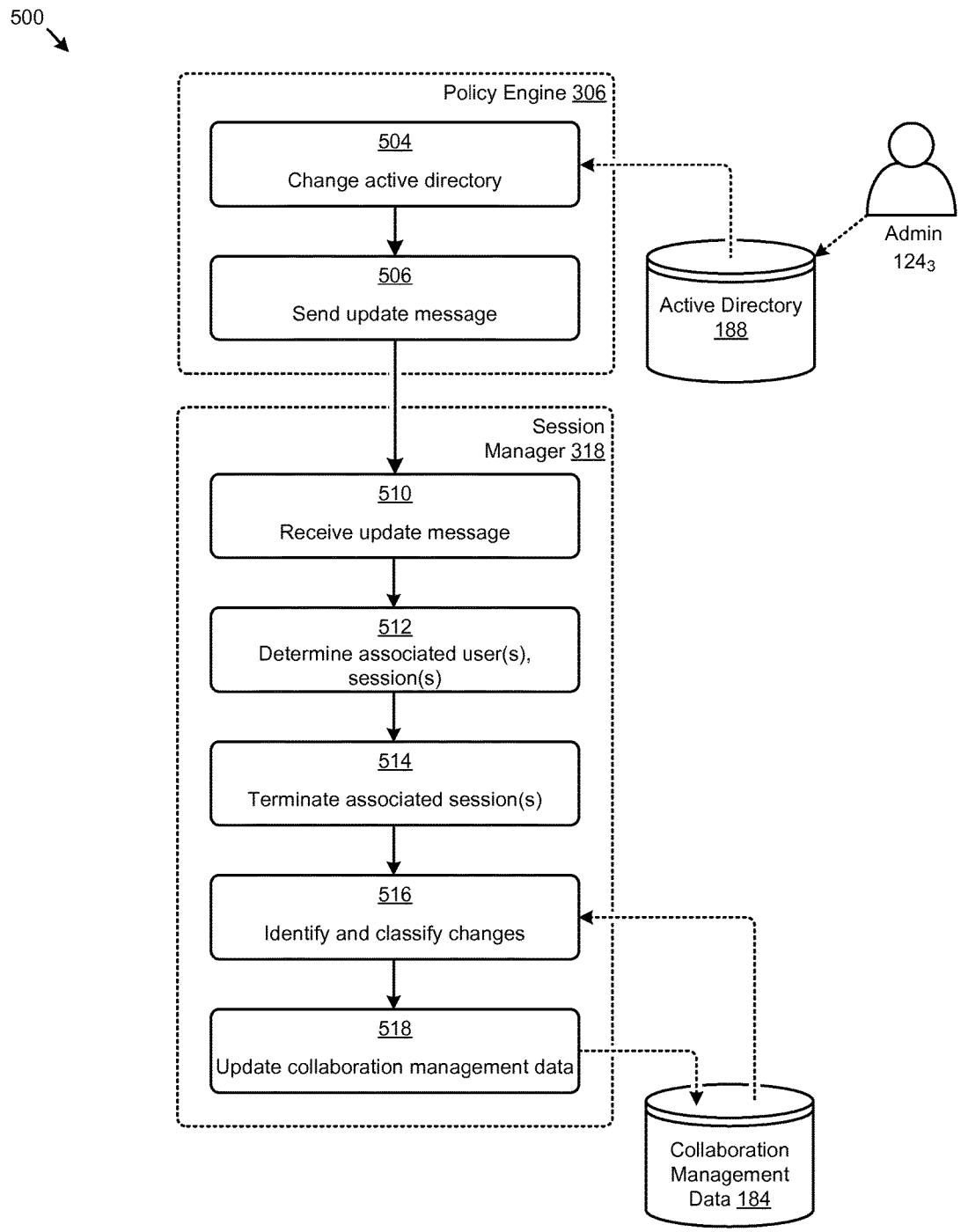
FIG. 5 presents an active directory synchronization technique implemented by systems for managing personalized online content access experiences using online session attributes, according to an embodiment.

Further details pertaining to the session manager and other components shown in system 300 are shown and discussed as pertaining to FIG. 4A, FIG. 4B, and FIG. 5.

FIG. 4A depicts a session management technique 4A00 implemented by systems for managing personalized online content access experiences using online session attributes. As an option, one or more variations of session management technique 4A00 or any aspect thereof may be implemented in the context of the architecture and functionality of the embodiments described herein. Also, the session management technique 4A00 or any aspect thereof may be implemented in any environment.

The session management technique 4A00 presents one embodiment of certain steps for managing and processing session attributes and associated sessions in systems for delivering personalized online content access experiences using online session attributes. In one or more embodiments the steps and underlying operations shown in the session management technique 4A00 can be executed by the session manager 318 in FIG. 3. For reference, the session management technique 4A00 further references the collaboration management data 184 comprising at least various instances of enterprise profiles 328, various instances of user profiles 326, and various instances of the session experience rules 324.

Specifically, the session management technique 4A00 can commence with receiving an OpenToken message (see step 404). For example, the OpenToken message can comprise certain session attributes corresponding to a content access session invoked by an enterprise user. The OpenToken can be decrypted (see step 406) and the key-value pairs encoded in the OpenToken message identified (see step 408). If one or more key-value pairs are identified as persistent data to be stored (see decision 410), the session manager 318 can store such persistent data in the collaboration management data 184 (see step 412). For example, an electronic record of the invoked session (e.g., user ID, time, location, device, etc.) might be stored in an instance of the user profiles 326 associated with the user requesting the session. The session manager 318 can further identify the session attributes extracted from the OpenToken message (see step 414) and apply certain instances of the session experience rules 324 to the session attributes (see step 422) to generate one or more workspace properties (see step 424) and to present a personalized experience using the generated workspace properties (see step 426). Such workspace properties can be used to deliver a personalized online content access experience to the user. More specifically, the personalized online content access experience can be delivered using the online session attributes received in the OpenToken message. Still more, inferred workspace properties can be determined (e.g., calculated, see step 423) from explicitly-provided session attributes (e.g., from explicitly-provided session attributes provided within a received OpenToken message) and/or can be inferred based on any information available to the session manager or its constituent components. Such inferred session attributes and/or inferred workspace properties can be used to deliver a personalized online content access experience to the user.

As earlier described, the session management technique 4A00 can update certain persistent data items included in the collaboration management data 184 (see decision 410 and step 412) based in part on session attributes received by the session manager 318.

FIG. 4B depicts a session management technique implemented by systems for managing personalized online content access experiences using predicted session attributes. As shown, an rules processing system 488 receives a slate of inputs (e.g., environmental variables 491, enterprise profiles, 328, user profiles 326, rule application heuristics 484, states 486, and state transition heuristics 492) and operates heuristics over the slate of inputs to produce inferred session experience attributes (e.g., see operation 480).

The environmental variables 491 can comprise any aspects of the user's environment (e.g., user device, presence of a storage device, operating system type and version, timezone, current time, etc.). Using the environmental variables, possibly in combination with other values or variables, the rules processing system can apply heuristics to make predictions. Values corresponding to session attributes that are related to the predictions can be calculated.

More specifically, the rules processing system 488 can accept inputs that can appear in any one or more of the shown inputs, and can apply heuristics (e.g., rule application heuristics 484). Such heuristics can be codified in the form of rules to be applied over a set of conditions determined from a set of inputs. The application of heuristics over the predicted session aspects and the set of conditions determined from the inputs can result in predictions, as well as the determination or calculation of session attribute values. Table 4 provides examples of calculated session attribute values using predicted session aspects. The predicted session attribute listing of Table 4 is merely exemplary. Predicted session attributes can be embodied as individual or groups of session parameters, and/or predicted content, and/or predicted collaborators, etc.

TABLE 4

Prediction/Calculation examples

| Session Attribute | Predicted Aspects (e.g., based on heuristics) | Calculated Session Attribute Value |
|---|---|---|
| user location | User will re-access the same content from previous accesses from this location | Pre-populate folder listings with recommended content |
| collaborators | User will access content frequently accessed by those collaborators | Pre-fetch content used by those collaborators |
| user timezone | User will most likely interface with collaborators in the same timezone | Pre-fetch status pertaining to those collaborators in the same timezone as the user timezone |

Continuing, and referring to the examples of Table 4, the rules processing system 488 can apply "IF-THEN-ELSE" or "SWITCH/CASE" logic over any of the inputs to determine one or more conditions (e.g., the predicate of an IF clause). Based on the conditions, one or more of a set of statements are executed so as to calculate, list-up or otherwise determine respective session attributes. For example, if the condition is present that the user's browsing location is "http://ABC.MyFolderRoot", then it can be heuristically-predicted that the user will want to access the same content (e.g., folders, objects, etc.) that was retrieved previous accesses from this location, thus a list of content that was retrieved previous accesses can be provided to a pre-fetcher by passing the calculated session attributes (e.g., the list of content that was retrieved previous accesses) to a pre-fetcher.

In some cases, the determination of one or more conditions (e.g., the predicate of an IF clause) can include a then-current state (e.g., see states 486) as well as one or more previous states. The one or more of a set of statements that are executed so as to calculate, list-up or otherwise determine respective session attributes can use state transition heuristics 492 to determine a next state from a previous state and/or a current state. For example, if the environmental variables indicate that the user has moved from one timezone to another timezone (e.g., which situation can be represented as a state change), a heuristic can be applied to predict that the user will most likely interface with collaborators in the new timezone, which might be a different set of collaborators than were the set of collaborators determined in a previous state. A pre-fetch operation pertaining to the status of the collaborators in the new timezone can be executed.

Further, the rules processing system 488 can output predicted session attributes 493 and calculated session attributes 494 in a form that can be used by a workspace property generator (e.g., workspace property formatter 498) to place workspace properties in a condition to be received by a workspace manager or other component of collaboration server 152.

In many situations, inputs to the rules processing system change frequently, and in some cases the enterprise might want to add, delete, or modify certain data items. For example, the enterprise might remove an employee from the workforce (e.g., remove from the enterprise active directory). In this and other such cases, the enterprise might need to update certain data items in the collaboration management data 184 yet without requiring that a respective content access session is invoked. Such a technique is discussed as pertains to FIG. 5.

FIG. 5 presents an active directory synchronization technique 500 implemented by systems for managing personalized online content access experiences using online session attributes. As an option, one or more variations of active directory synchronization technique 500 or any aspect thereof may be implemented in the context of the architecture and functionality of the embodiments described herein. Also, the active directory synchronization technique 500 or any aspect thereof may be implemented in any environment.

The active directory synchronization technique 500 presents one embodiment of certain steps for updating one or more data items stored at a cloud-based content management platform (e.g., in collaboration management data 184) according to data items stored at the active directory (e.g., active directory 188) of an enterprise client of the cloud-based content management platform. In one or more embodiments, the steps and underlying operations shown in the active directory synchronization technique 500 can be executed by the policy engine 306 and the session manager 318 in FIG. 3. For reference, the active directory synchronization technique 500 further references the active directory 188 and the collaboration management data 184.

Specifically, the active directory synchronization technique 500 can commence with changing one or more data items in the active directory 188 (see step 504). For example, an admin $124_3$ at the enterprise associated with the active directory 188 might make certain changes to the active directory 188 based on various activities (e.g., new employee onboarding, employee job change, employee termination, etc.). Using the herein disclosed systems and techniques, an update message can be sent (see step 506) from the enterprise (e.g., the policy engine at the identity provider) to the cloud-based content management platform (e.g., the session manager at the collaboration server) to synchronize the data between the active directory 188 and the collaboration management data 184. For example, the information describing the changes can be included in a SAML assertion that can be received and converted by a federation server (e.g., federation server 119) so as to be delivered as an OpenToken message to the session manager 318. The session manager 318 can receive the update message (see step 510).

Operations initiated upon receiving the update message might include decrypting the message (e.g., OpenToken message) and/or parsing the update message to identify the encoded key-value pairs. The session manager 318 can then determine any users and/or any sessions that might be associated with the updates comprising the update message (see step 512). For example, update information indicating a user with a currently open session has changed status (e.g., "permanent" to "terminated"). In this case and other cases, the associated sessions can be terminated (see step 514). The session manager 318 can then identify and classify the changes delivered in the update message (see step 516) and update the collaboration management data 184 accordingly (see step 518). For example, certain changes might be classified as persistent, such that the corresponding data in the collaboration management data 184 is overwritten. Further, other changes might be classified as temporary such that new data is written to the collaboration management data 184 and flagged as temporary (e.g., with an expiration time).

As hereinabove discussed, a session manager 318 can identify and classify various sorts of collaboration management data 184. In particular, a session manager can receive information pertaining a currently open session or a soon-to-be-opened session and can include such information in combination with any session attributes when generating workspace session properties. In this and other situations, the session configuration can be used ephemerally, and applied only to a single session. Such ephemeral session configurations can be updated or established such that the ephemeral session properties (e.g., ephemeral workspace session properties) pertain only to the then-current sessions and/or workspaces, and not to other sessions. In such cases workspace session properties are not persistent, and such session attributes and/or workspace session properties are not stored persistently for retrieval by or for another session. Non-ephemeral session configurations can be stored, and indeed can be configured using an administrator interface. One embodiment of a user interface for establishing such rules is described in FIG. 6.

Figure 6:
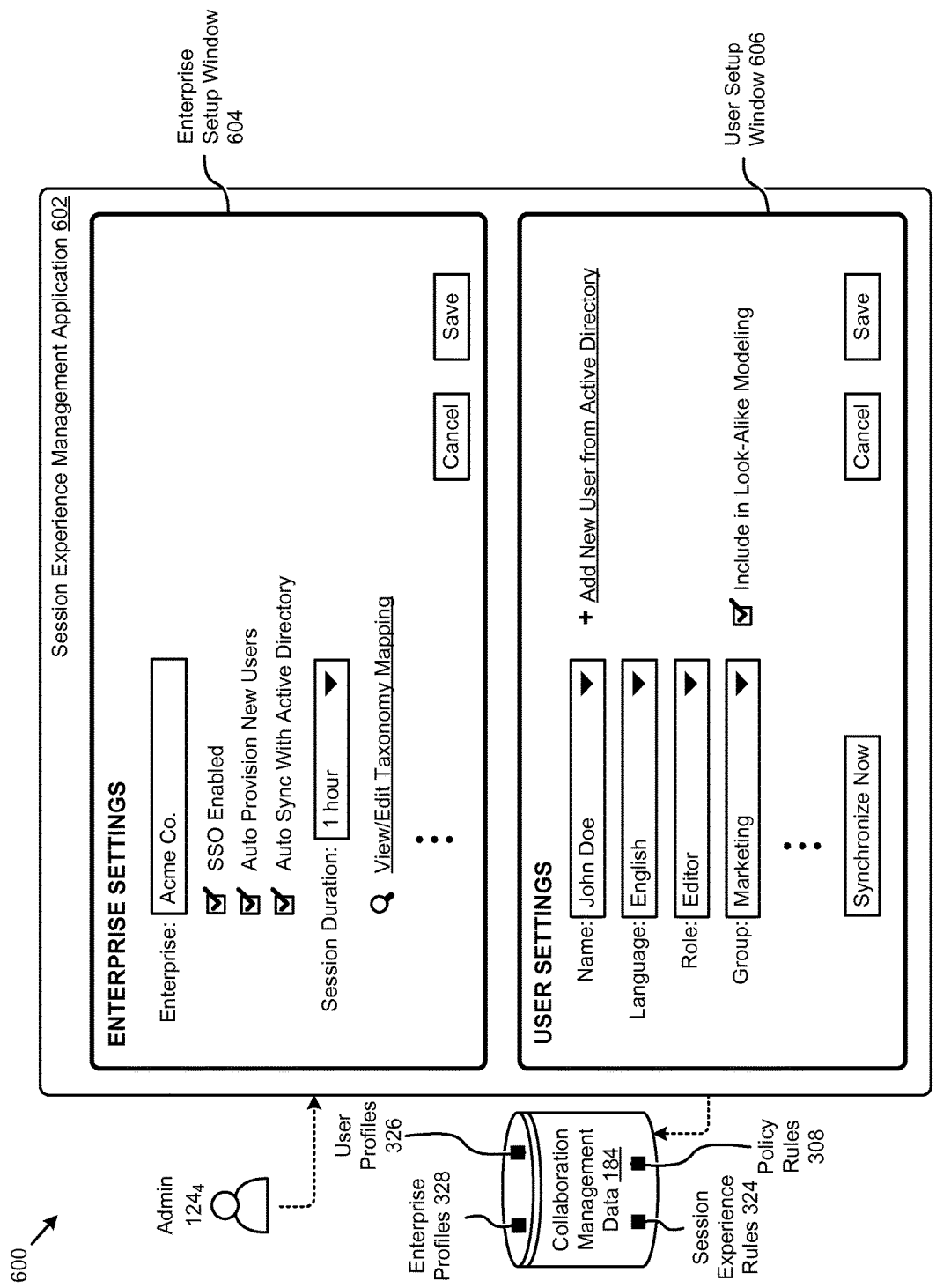
FIG. 6 depicts an enterprise administrator interface to facilitate specification of settings for managing personalized online content access experiences using online session attributes, according to an embodiment.

FIG. 6 depicts an enterprise administrator interface 600 to facilitate specification of settings for managing personalized online content access experiences using online session attributes. As an option, one or more variations of enterprise administrator interface 600 or any aspect thereof may be implemented in the context of the architecture and functionality of the embodiments described herein. Also, the enterprise administrator interface 600 or any aspect thereof may be implemented in any environment.

As discussed throughout, certain rules (e.g., session experience rules 324, policy rules 308, etc.) can be used to implement the herein disclosed techniques for providing personalized online content access experiences using online session attributes. The enterprise administrator interface 600 shown in FIG. 6 can be used by an administrator collaborator, such as admin 124$_4$, to establish various instances of session experience rules 324 that can be stored in collaboration management data 184 and used by a cloud-based content management platform according to the herein disclosed techniques. In some cases, the settings established with the enterprise administrator interface 600 can be further used to specify certain data items in the enterprise profiles 328 and/or other data records (e.g., the policy rules 308). Such data items in the collaboration management data 184 and other storage facilities can be used by the herein disclosed techniques for managing personalized online content access experiences using online session attributes. In one or more embodiments, the enterprise administrator interface 600 can be included in a session experience management application 602 provided by the cloud-based content management platform to operate on one or more computing devices (e.g., security management interface 211, an instance of user devices 102, etc.).

More specifically, the enterprise administrator interface 600 can comprise an enterprise setup window 604 and a user setup window 606. As shown, the enterprise setup window 604 can present various input entry elements (e.g., dropdown selections, text boxes, etc.) through which the admin 124$_4$ can associate various identity and session management rules with a given enterprise (e.g., "Acme Co."). For example, as shown, the admin 124$_4$ might enable (e.g., by clicking a checkbox) SSO for the enterprise users such that the users can be authenticated and authorized to use the services of the cloud-based content management platform yet not provide a password to the platform (e.g., using SAML assertions through a federate server such as federate server 119). The admin 124$_4$ can further choose to enable automatic provisioning of new users. Specifically, for example, a new user in the enterprise active directory yet not in the collaboration management data 184 (e.g., no associated instance of the user profiles 326) can be automatically setup in the collaboration management data 184 based on the user attributes (e.g., an instance of user attributes 127$_4$) included in the session attributes (e.g., an instance of session attributes 128$_4$) received by the session manager 318. Also, the admin 124$_4$ can choose to have the collaboration management data 184 be automatically synchronized with the enterprise active directory (e.g., using the active directory synchronization technique 500). For security purposes, the enterprise setup window 604 might further enable the admin 124$_4$ to establish an enterprise-wide session duration of "1 hour", after which the tokens associated with the session are refreshed. In this and many other cases, the session attributes are ephemeral—they are not persistent (e.g., stored and/or retrieved and/or restored with respect to the session) but rather the session attributes, wherever they are not-persistent, can be re-requested from an appropriate computing node in the environment and re-applied into a new session and/or workspace.

Further, the admin 124$_4$ can use the enterprise setup window 604 to view and/or edit a taxonomy mapping (e.g., by clicking link "View/Edit Taxonomy Mapping"). Specifically, such a taxonomy mapping might specify the relationships between terms and settings used by the enterprise, and terms and settings used by the cloud-based content management platform. For example, enterprise-assigned privilege levels of "Limited", "Basic", and "Advanced" might map to the cloud-based content management platform roles of "User Collaborator", "Creator Collaborator", and "Administrator collaborator", respectively. In some cases, the cloud-based content management platform can implement numerous access and privilege levels to offer flexibility across all enterprise clients. In such cases, the taxonomy mapping can map such numerous levels to fewer levels familiar to the enterprise (e.g., admin 124$_4$). Other identity and session management rules associated with a given enterprise can be established using the enterprise setup window 604.

Further, the user setup window 606 can present various input entry elements (e.g., dropdown selections, text boxes, etc.) through which the admin 124$_4$ can associate various profile attributes and session management rules with a given user. Specifically, as shown, the admin 124$_4$ might select an existing user from a dropdown selection (e.g., "John Doe"), or add a new user from the active directory of the enterprise (e.g., by clicking link "Add New User from Active Directory"). For example, an existing user might have an earlier established user profile stored in the collaboration management data 184. In comparison, a new user might have user attributes stored in the enterprise active directory, but might not yet have an associated user profile stored in the collaboration management data 184. In some embodiments, adding a new user from the user setup window 606 can invoke the active directory synchronization technique 500 to create a new user profile in the collaboration management data 184 and update the data items in the user profile.

The admin 124$_4$ can further select a language and/or a group associated with the selected user from respective dropdown selections. For example, the selections available in such dropdown selections can be derived from a higher order set of terms familiar to the enterprise (e.g., admin $124_4$) and mapped (e.g., in the enterprise taxonomy mapping) to a more complex hierarchy of terms used by the cloud-based content management platform. In some embodiments, the admin $124_4$ can further include the selected user in a look-alike model for the user's group (e.g., by selecting the checkbox "Include in Look-Alike Modeling"). For example, making such a selection might include the session activity of the selected user (e.g., "John Doe") in inferring the intent of the sessions invoke by other users in the user's group (e.g., "Marketing"). The admin $124_4$ might also use the user setup window 606 to invoke (e.g., by clicking "Synchronize Now") an immediate update of the data items in the collaboration management data 184 associated with a selected user. For example, such an update might use an embodiment of the active directory synchronization technique 500. Other profile attributes and session management rules associated with a given user can be established using the user setup window 606.

Additional Embodiments of the Disclosure

Additional Practical Application Examples

Figure 7A:
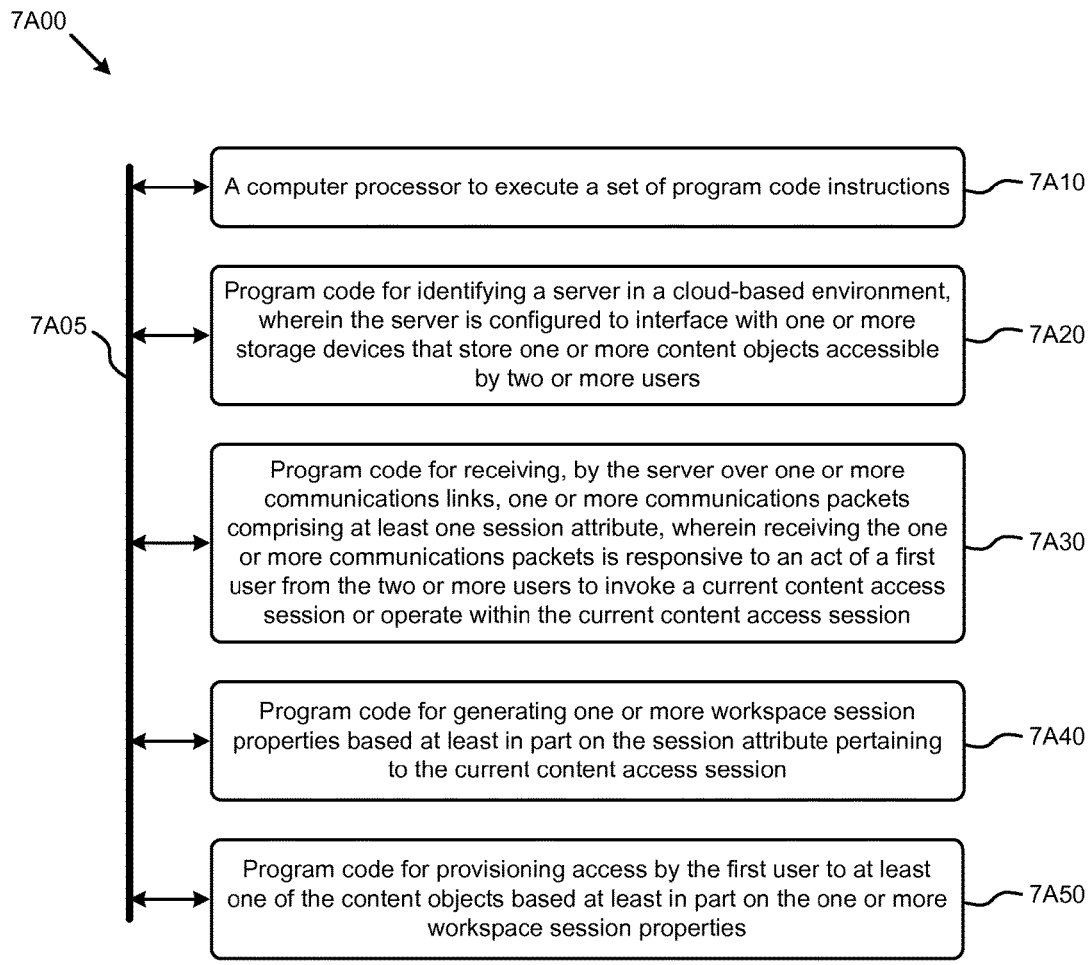
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. The partitioning of system 7A00 is merely illustrative and other partitions are possible. As an option, the present system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising a computer processor to execute a set of program code instructions (see module 7A10) and modules for accessing memory to hold program code instructions to perform: identifying a server in a cloud-based environment, wherein the server is configured to interface with one or more storage devices that store one or more content objects accessible by one or more users (see module 7A20); receiving, by the server over one or more communications links, one or more communications packets comprising at least one session attribute, where receiving the one or more communications packets is responsive to an act of a first user from the two or more users to invoke a current content access session or operate within the current content access session (see module 7A30); generating one or more workspace session properties based at least in part on the session attribute pertaining to the current content access session (see module 7A40); and provisioning access by the first user to at least one of the content objects based at least in part on the one or more workspace session properties (see module 7A50).

Some embodiments include steps for identifying an active directory that stores a plurality of user attributes, where a first portion of the plurality of user attributes is associated with the respective one of the two or more users, and then receiving, at the server at least some of the plurality of user attributes, where at least some of the plurality of user attributes result from a change in the active directory.

Figure 7B:
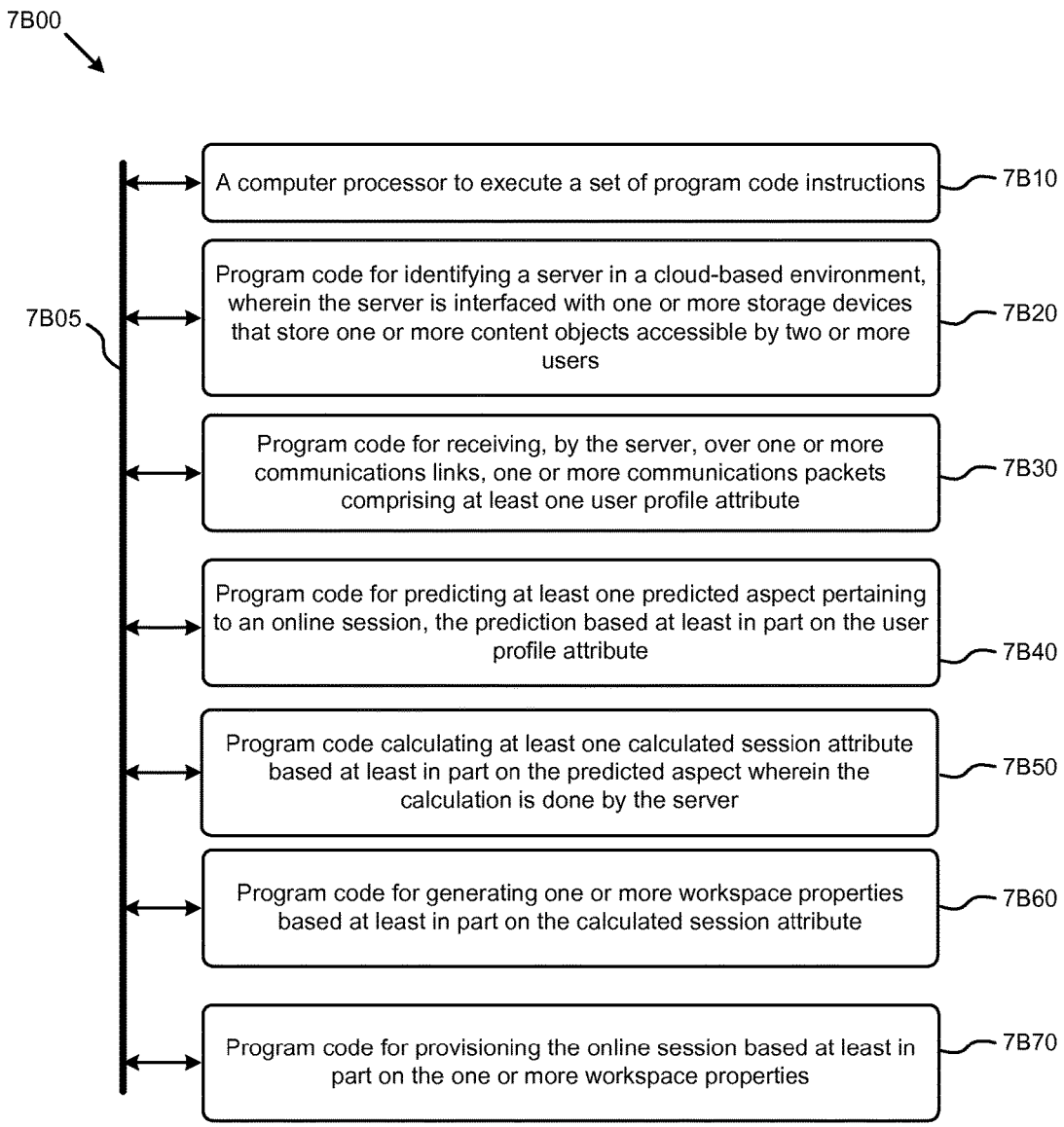

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the present system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising a computer processor to execute a set of program code instructions (see module 7B10) and modules for accessing memory to hold program code instructions to perform: identifying a server in a cloud-based environment, wherein the server is interfaced with one or more storage devices that store one or more content objects accessible by one or more users (see module 7B20); receiving, by the server, over one or more communications links, one or more communications packets comprising at least one user profile attribute (see module 7B30); predicting at least one predicted aspect pertaining to an online session, the prediction based at least in part on the user profile attribute; (see module 7B40); calculating at least one calculated session attribute value based at least in part on the predicted aspect wherein the calculation is done by the server (see module 7B50); generating one or more workspace properties based at least in part on the calculated session attribute value (see module 7B60); and provisioning the online session based at least in part on the one or more workspace properties (see module 7B70).

System Architecture Overview

Additional System Architecture Examples

Figure 8A:
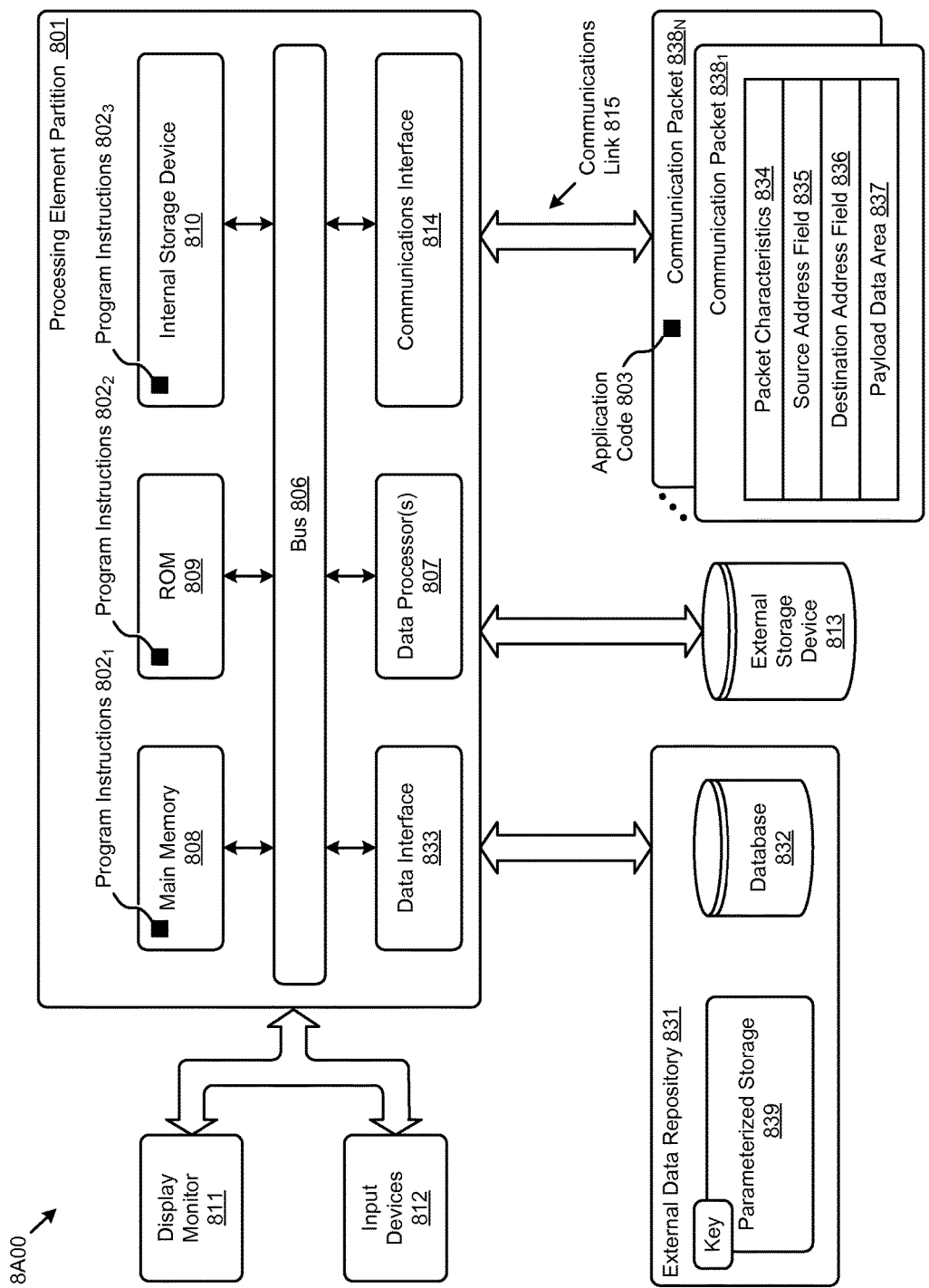
FIG. 8A and FIG. 8B depict block diagrams of an instance of a computer system suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communications packets $838_1 \ldots 838_N$ comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). A module may include one or more state machines and/or combinational logic used to implement or facilitate the performance characteristics of systems for providing personalized online content access experiences using online session attributes.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of providing personalized online content access experiences using online session attributes). Such files or records can be brought into and/or stored in volatile or non-volatile memory.

Figure 8B:
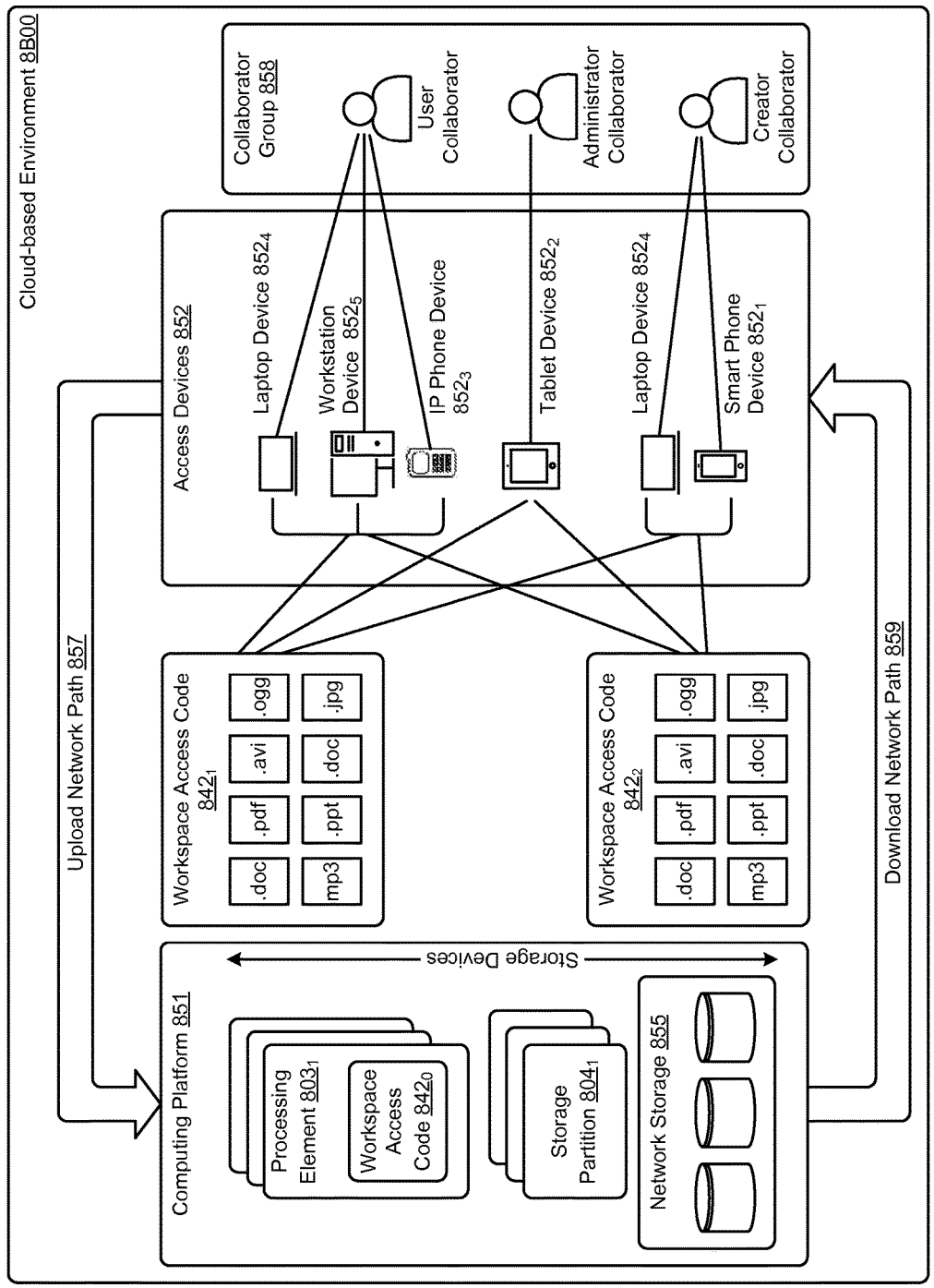

FIG. 8B depicts a block diagram of an instance of a cloud-based environment 8B00. Such a cloud-based environment supports access to workspaces through the execution of workspace access code (e.g., workspace access code $842_0$, workspace access code $842_1$ and workspace access code $842_2$). Workspace access code can be executed on any of the shown access devices 852 (e.g., laptop device $852_4$, workstation device $852_5$, smart phone device $852_1$, IP phone device $852_3$, tablet device $852_2$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform 851, including in a middleware setting. As shown, a portion of the workspace access code resides in and can be executed on one or more processing elements (e.g., processing element $803_1$). The workspace access code can interface with storage devices such the shown network storage 855. Storage of workspaces and/or any constituent files or objects, and/or any other code or scripts or data can be stored in any one or more storage partitions (e.g., storage partition $804_1$). In some environments, a processing element includes forms of storage such as RAM and/or ROM and/or FLASH, and/or other forms of volatile and non-volatile storage.

A stored workspace can be populated via an upload (e.g., an upload from client devices to a processing element over an upload network path 857). A stored workspace can be delivered to a particular user and/or shared with other particular users via a download (e.g., a download from a processing element to a user device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a collaboration server in a cloud-based environment, wherein the collaboration server is interfaced with one or more storage devices that store one or more content objects shared by a group of collaborators, the group of collaborators comprising at least a first collaborator and a second collaborator, wherein the first collaborator and the second collaborator are different;
   receiving, by the collaboration server, over one or more communications links, one or more communications packets comprising at least one user profile attribute, wherein the at least one user profile attribute is associated with the first collaborator;
   predicting at least one predicted aspect pertaining to an online session for the first collaborator based at least in part on the user profile attribute associated with the first collaborator, wherein the prediction corresponds to a content object accessed by the second collaborator;
   calculating at least one calculated session attribute value based at least in part on the predicted aspect wherein the calculation is performed by the collaboration server;
   generating one or more workspace properties for the first collaborator based at least in part on the calculated session attribute value; and
   provisioning access, for the first collaborator, to the content object accessed by the second collaborator based at least in part on the one or more workspace properties.

2. The method of claim 1, wherein the predicted aspect is based at least in part on at least one of, a collaboration group, or a user location, or a user timezone, or a user language preference.

3. The method of claim 1, wherein the calculated session attribute value is at least one of, an order of listing of the one or more content objects, or a branding personalization, or a color palette, or any combination thereof.

4. The method of claim 1, wherein the one or more communications packets comprise at least one of, a SAML assertion, or an OpenToken message.

5. The method of claim 1, wherein generating the one or more workspace properties is based at least in part on a first portion of collaboration management data.

6. The method of claim 1, wherein generating the one or more workspace properties is based at least in part on one or more session experience rules.

7. The method of claim 5, wherein the first portion of the collaboration management data comprises at least one of, an enterprise profile, or a user profile, or a combination thereof.

8. The method of claim 5, wherein the first portion of the collaboration management data comprises one or more session experience rules.

9. The method of claim 5, wherein a second portion of the collaboration management data is modified based at least in part on the at least one session attribute or to comprise at least a portion of session history.

10. The method of claim 1, wherein the at least one predicted aspect pertaining to an online session and the at least one calculated session attribute value both correspond to an inferred session attribute.

11. A computer program product, embodied in a non-transitory computer readable medium, the non-transitory computer readable medium having stored thereon a sequence of instructions which, when stored in memory and executed by a processor causes the processor to perform a set of acts, the acts comprising:
   identifying a collaboration server in a cloud-based environment, wherein the collaboration server is interfaced with one or more storage devices that store one or more content objects shared by a group of collaborators, the group of collaborators comprising at least a first collaborator and a second collaborator, wherein the first collaborator and the second collaborator are different;
   receiving, by the collaboration server, over one or more communications links, one or more communications packets comprising at least one user profile attribute, wherein the at least one user profile attribute is associated with the first collaborator;

predicting at least one predicted aspect pertaining to an online session for the first collaborator based at least in part on the user profile attribute associated with the first collaborator, wherein the prediction corresponds to a content object accessed by the second collaborator;

calculating at least one calculated session attribute value based at least in part on the predicted aspect wherein the calculation is performed by the collaboration server;

generating one or more workspace properties for the first collaborator based at least in part on the calculated session attribute value; and provisioning access, for the first collaborator, to the content object that is accessed by the second collaborator based at least in part on the one or more workspace properties.

12. The computer program product of claim 11, wherein the predicted aspect is based at least in part on at least one of, a collaboration group, or a user location, or a user timezone, or a user language preference.

13. The computer program product of claim 11, wherein the calculated session attribute value is at least one of, an order of listing of the one or more content objects, or a branding personalization, or a color palette, or any combination thereof.

14. The computer program product of claim 11, wherein the one or more communications packets comprise at least one of, a SAML assertion, or an OpenToken message.

15. The computer program product of claim 11, wherein generating the one or more workspace properties is based at least in part on a first portion of collaboration management data.

16. The computer program product of claim 11, wherein generating the one or more workspace properties is based at least in part on a first portion of collaboration management data.

17. The computer program product of claim 15, wherein the first portion of the collaboration management data comprises at least one of, an enterprise profile, or a user profile, or a combination thereof.

18. The computer program product of claim 15, wherein a second portion of the collaboration management data is modified to comprise at least a portion of session history.

19. A system comprising:

a collaboration server in a cloud-based environment, wherein the collaboration server is interfaced with one or more storage devices that store one or more content objects shared by a group of collaborators, the group of collaborators comprising at least a first collaborator and a second collaborator, wherein the first collaborator and the second collaborator are different;

a network component to receive one or more communications packets comprising at least one user profile attribute, wherein the at least one user profile attribute is associated with a first collaborator from among the two or more collaborators; and a session manager module to:
predict at least one predicted aspect for the first collaborator based at least in part on the user profile attribute associated with the first collaborator, wherein the prediction corresponds to a content object accessed by the second collaborator;

calculate at least one calculated session attribute value based at least in part on the predicted aspect wherein the calculation is performed by the collaboration server;

generate one or more workspace properties based at least in part on the calculated session attribute value; and provision access, for the first collaborator, to the content objects accessed by the second collaborator based at least in part on the one or more workspace properties.

20. The system of claim 19, wherein the calculated session attribute value is at least one of, an order of listing of the one or more content objects, or a branding personalization, or a color palette, or any combination thereof.

* * * * *